(12) United States Patent
Kaitha et al.

(10) Patent No.: US 12,271,903 B2
(45) Date of Patent: Apr. 8, 2025

(54) METHODS AND SYSTEMS FOR FACILITATING PAYMENT TRANSACTIONS TO DELIVERY AGENTS

(71) Applicant: MASTERCARD INTERNATIONAL INCORPORATED, Purchase, NY (US)

(72) Inventors: Selwyn Kaitha, Mumbai (IN); Amitabh Khanna, Navi Mumbai (IN); Abhishek Kurdukar, Mumbai (IN)

(73) Assignee: MASTERCARD INTERNATIONAL INC., Purchase, NY (US)

( * ) Notice: Subject to any disclaimer, the term of this patent is extended or adjusted under 35 U.S.C. 154(b) by 124 days.

(21) Appl. No.: 17/747,933

(22) Filed: May 18, 2022

(65) Prior Publication Data
US 2022/0374898 A1    Nov. 24, 2022

(30) Foreign Application Priority Data
May 21, 2021    (IN) .............................. 202141022834

(51) Int. Cl.
*G06Q 20/40*    (2012.01)
*G06Q 20/10*    (2012.01)

(52) U.S. Cl.
CPC ......... *G06Q 20/4014* (2013.01); *G06Q 20/10* (2013.01); *G06Q 20/405* (2013.01)

(58) Field of Classification Search
CPC ... G06Q 20/405; G06Q 20/10; G06Q 20/4014
See application file for complete search history.

(56) References Cited

U.S. PATENT DOCUMENTS

| | | | | |
|---|---|---|---|---|
| 11,361,284 B1* | 6/2022 | Thairu | ................. | G06Q 20/027 |
| 2019/0333087 A1* | 10/2019 | Appana | ................ | G06Q 20/348 |

OTHER PUBLICATIONS

Ridelancer, "Postmates Prepaid Card: How to Use It", Dec. 20, 2020, retrieved from wayback machine at https://web.archive.org/web/20210515210829/https://ridelancer.com/postmates-prepaid-card/. (Year: 2020).*

(Continued)

*Primary Examiner* — Jamie R Kucab
*Assistant Examiner* — Scott Michael Diroma
(74) *Attorney, Agent, or Firm* — Barta Jones, PLLC

(57) ABSTRACT

Embodiments provide electronic methods and systems for facilitating payment transactions to delivery agents. The method performed by a server system includes obtaining order related data associated with an order placed by a customer with a merchant. The method includes determining whether a payment transaction amount is within one or more transaction threshold limits or not. Further the method includes facilitating a credit transaction by an issuer server for effectuating a transfer of the payment transaction amount to a payment instrument of a delivery agent. The method further includes receiving a payment transaction request in response to using the payment instrument at a payment terminal associated with the merchant. The method includes transmitting a payment authorization request message to the issuer server. The issuer server authorizes the payment transaction request based on the unique reference identifier, thereby enabling transfer of the payment transaction amount from the payment instrument to the merchant.

20 Claims, 13 Drawing Sheets

(56) References Cited

OTHER PUBLICATIONS

"Can you set a limit on corporate credit cards?" Brex, Oct. 3, 2019, retrieved from https://www.brex.com/resources/set-corporate-card-limit. (Year: 2019).*

Google Search results for "company transaction limit" retrieved on Dec. 15, 2023. (Year: 2023).*

YouTube "Door Dash Dasher: How to Maximize Peak Pay Bonuses" https://www.youtube.com/watch?v=Ep44R8WQBJk, timestamp 1:23. (Year: 2020).*

Uber.com "Cash deliveries is available", retrieved from wayback machine for May 13, 2021 at https://web.archive.org/web/20210513195009/https://www.uber.com/jp/en/drive/delivery/cash-delivery/ (Year: 2021).*

Blog.famzoo.com Dwight B, "Popmoney Makes Loading Your Prepaid Card from Your Checking Account a Snap", retrieved from wayback machine for Apr. 15, 2021 from https://web.archive.org/web/20210415225713/https://blog.famzoo.com/2016/01/popmoney-load-prepaid-card-from-checking-account.html. (Year: 2021).*

* cited by examiner

| UNIQUE DATA FIELD 402 | FIELD DESCRIPTION 404 | DETAILS 406 |
|---|---|---|
| DE 002 | CARD NUMBER | TO IDENTIFY PAYMENT CARD NUMBER |
| DE 004 | TRANSACTION AMOUNT / ORDER AMOUNT | TO IDENTIFY THE ORDER AMOUNT REQUESTED AND TO COMPARE WITH THE THRESHOLD TRANSACTION LIMIT |
| DE 043 | MERCHANT NAME | TO IDENTIFY THE MERCHANT / RESTAURANT NAME |
| DE 003 | PROCESSING CODE | TO PROCESS CREDIT OF THE PAYMENT CARD WITH THE REQUESTED ORDER AMOUNT |
| DE 48 SUB ELEMENT 41 sf 2 | UNIQUE REFERENCE NUMBER | TO MATCH OFF BETWEEN AUTHENTICATION AND AUTHORIZATION STAGE AND SHARE END OF THE DAY RECONCILIATION FILE WITH THE FOOD DELIVERY APP COMPANIES |
| DE 039 | RESPONSE CODE | TO DECLINE A CREDIT TRANSACTION |

METHODS AND SYSTEMS FOR FACILITATING PAYMENT TRANSACTIONS TO DELIVERY AGENTS

CROSS-REFERENCE TO RELATED APPLICATION

This application claims priority to Indian Patent Application No. 202141022834 filed May 21, 2021, entitled "Methods and Systems for Facilitating Payment Transactions to Delivery Agents", the entirety of which is hereby incorporated by reference.

TECHNICAL FIELD

The present disclosure relates to electronic payment systems and more particularly relates to, electronic methods and systems facilitating a payment transaction for an order at a merchant via a payment instrument of a delivery agent on behalf of a customer in pay-on-delivery (POD) orders.

BACKGROUND

In recent times, consumers are dependent on order delivery companies for home delivery of articles or items. Prominent examples of such articles or items may be food items. Some other examples are grocery, medicines, or other consumable items. Taking into consideration, the example of food delivery companies, customers extensively order food from a restaurant using an online food delivery application managed by a food delivery company. Typically, a delivery agent of the food delivery company is assigned with the food order placed by the consumer for delivering the food items to the consumers (i.e. door-to-door delivery facility). This process eliminates the need for the consumers to go to the restaurants for ordering food, thereby enabling a hassle-free enjoyment and relaxation to the consumers.

Traditionally, the food delivery companies provide advance cash to each of the delivery agents on a periodic basis (e.g., at beginning of every week, or on a daily basis). The advance cash is used by the delivery agent for paying to the merchant for the food order placed by the consumers by opting pay-on-delivery (POD) mode. Thereafter, the delivery agent is required to collect transaction amount associated with the food order from the consumer upon delivering the food order. However, handling the cash is insecure and also involves handling charges (or fee). Further, reconciliation involves a time-consuming process for the food delivery companies due to handling of the cash. Additionally, unwanted scenarios such as the delivery agent absconding post receiving the advance cash from the food delivery company, losing the cash, theft, cannot be ruled out, thus incurring loss to the food delivery company.

Thus, there exists a need for a technological solution for eliminating or minimizing risk and/or contingency cost incurred to the article delivery companies that are engaged in delivering articles or items to the consumers.

SUMMARY

Various embodiments of the present disclosure provide methods and systems for offering payment transaction by using a payment instrument provided to delivery agents by the order delivery entity to pay towards an order in pay-on-delivery mode to merchants.

In an embodiment, a computer-implemented method is disclosed. The computer-implemented method performed by a server system includes obtaining order related data associated with an order placed by a customer with a merchant on an order delivery application accessible on a customer device of the customer. The order related data includes a payment transaction amount to be paid by the customer in pay-on-delivery (POD) mode, a merchant identifier associated with the merchant and information of payment instrument associated with a delivery agent selected for delivering the order from a location of the merchant to the customer. The computer-implemented method includes determining whether the payment transaction amount is within one or more transaction threshold limits or not. Further, the computer-implemented method includes facilitating, by the server system, a credit transaction by an issuer server for effectuating a transfer of the payment transaction amount from an account of an order delivery entity to the payment instrument of the delivery agent on real-time, in response to determining the payment transaction amount is within the one or more transaction threshold limits. The computer-implemented method includes assigning a unique reference identifier corresponding to the credit transaction and transmitting a message to the issuer server associated with the order delivery entity. The message includes the unique reference identifier. The computer-implemented method includes receiving a payment transaction request in response to using the payment instrument at a payment terminal associated with the merchant for transferring the payment transaction amount to the merchant on behalf of the customer. Further, the computer-implemented method further includes transmitting a payment authorization request message by populating a plurality of data fields with corresponding values based, at least in part, on the order related data and the unique reference identifier to the issuer server. The issuer server authorizes the payment transaction request based at least on the unique reference identifier, thereby enabling transfer of the payment transaction amount from the payment instrument to the merchant.

In another embodiment, a server system is disclosed. The server system includes a communication interface, a memory comprising executable instructions and a processor communicably coupled to the communication interface. The processor is configured to execute the instructions to cause the server system to at least obtain order related data associated with an order placed by a customer with a merchant on an order delivery application accessible on a customer device of the customer. The order related data includes a payment transaction amount to be paid by the customer in pay-on-delivery (POD) mode, a merchant identifier associated with the merchant and information of payment instrument associated with a delivery agent selected for delivering the order from a location of the merchant to the customer. The server system is caused to determine whether the payment transaction amount is within one or more transaction threshold limits or not. Further, the server system is caused to facilitate a credit transaction by an issuer server for effectuating a transfer of the payment transaction amount from an account of an order delivery entity to the payment instrument of the delivery agent on real-time, in response to determining the payment transaction amount is within the one or more transaction threshold limits. The server system is caused to assign a unique reference identifier corresponding to the credit transaction and transmit a message to the issuer server associated with the order delivery entity. The message includes the unique reference identifier. The server system is caused to receive a payment transaction request in response to using the payment instrument at a payment terminal associated with the merchant for transferring the payment transaction amount to the merchant on behalf of the customer. The payment transaction request includes the information of the payment instrument, the merchant identifier and the payment transaction amount. Further, the server system is caused to validate the information of the payment instrument, the merchant identifier and the payment transaction amount with the order related data. The server system is caused to retrieve the unique reference identifier based on determining a match between the information of the payment instrument, the merchant identifier and the payment transaction amount, and the order related data. The server system is caused to transmit a payment authorization request message by populating a plurality of data fields with corresponding value based at least on the order related data and the unique reference identifier to the issuer server. The issuer server authorizes the payment transaction based at least on the unique reference identifier, thereby enabling transfer of the payment transaction amount from the payment instrument to the merchant.

BRIEF DESCRIPTION OF THE FIGURES

For a more complete understanding of example embodiments of the present technology, reference is now made to the following descriptions taken in connection with the accompanying drawings in which:

FIG. 4 is an example representation of a table showing data fields for processing the payment transaction associated with the payment instrument, in accordance with an example embodiment of the present disclosure;

Figure 1:
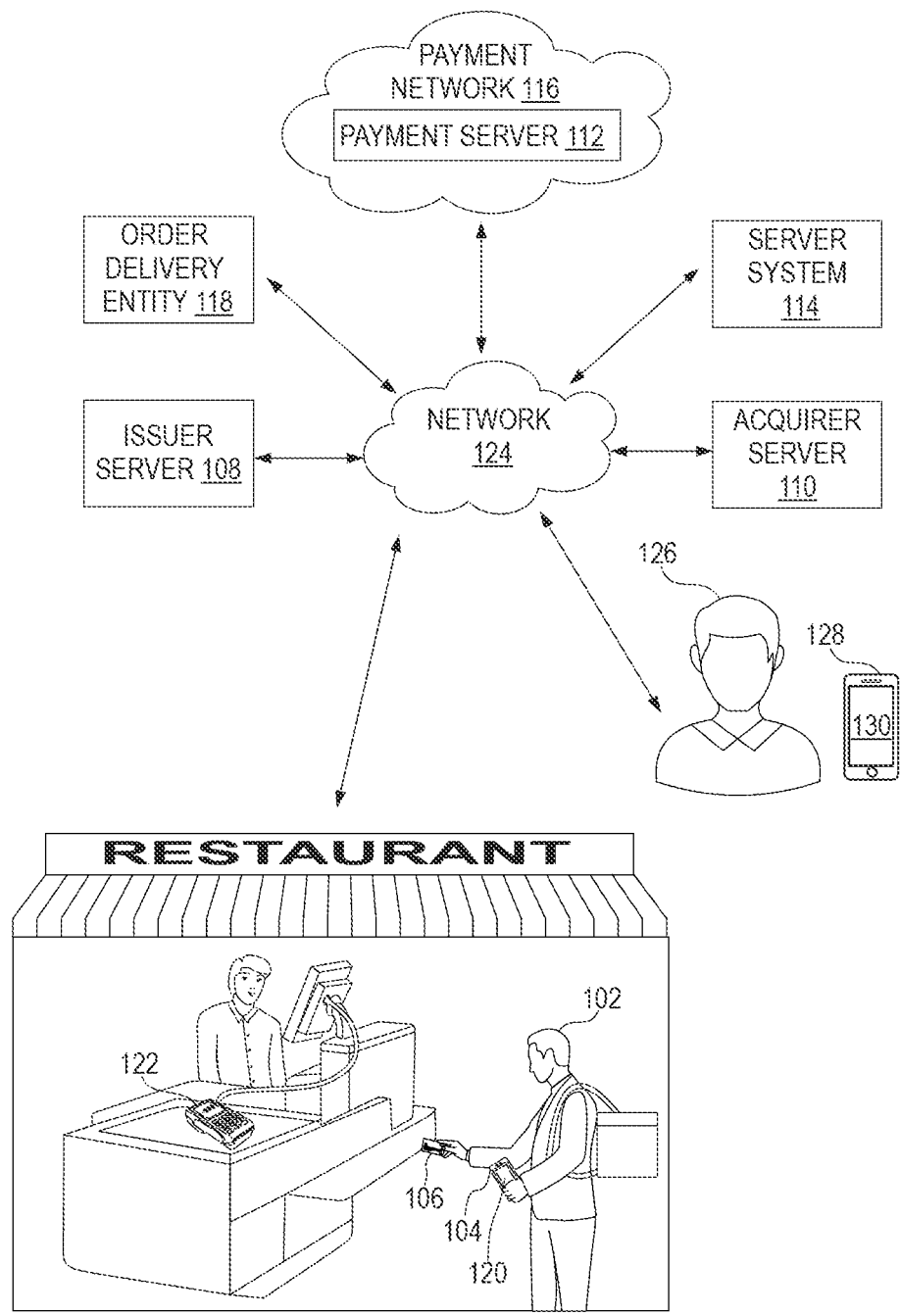
FIG. 1 is an example representation of an environment, related to at least some example embodiments of the present disclosure.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details.

Reference in this specification to "one embodiment" or "an embodiment" means that a particular feature, structure, or characteristic described in connection with the embodiment is included in at least one embodiment of the present disclosure. The appearances of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

The term "issuer", used throughout the description, refers to a financial institution normally called as an "issuer bank" or "issuing bank" in which an individual or an institution may have an account. The issuer also issues a payment card, such as a credit card or a debit card, etc. Further, the issuer may also facilitate online banking services such as electronic money transfer, bill payment, etc., to the account holders through a server system called as "issuer server" throughout the description.

The term "payment instrument", used throughout the description, refers to a paper-based or electronic payment means or other payment means used to initiate the transfer of funds. Example of the payment instruments includes payment accounts, payment cards (such as, debit card, credit card, etc.), digital payment cards, e-wallets, etc. Examples of the payment card include, but are not limited to, debit cards, credit cards, prepaid cards, virtual payment numbers, virtual card numbers, forex cards, charge cards, and stored-value cards. A payment card may be a physical card that may be presented to the merchant for funding the payment. Alternatively, or additionally, the payment card may be embodied in form of data stored in a user device, where the data is associated with payment account such that the data can be used to process the financial transaction between the payment account and a merchant's financial account.

The term "payment network", used throughout the description, refers to a network or collection of systems used for transfer of funds through use of cash-substitutes. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be operated to perform transactions via cash-substitutes, which may include payment cards, letters of credit, checks, financial accounts, etc. One example of a payment network includes those operated by Mastercard.

OVERVIEW

Various embodiments of the present invention provide a server system and methods implemented therein. The server system is configured to facilitate credit of an advance electronic payment (e.g., in a pre-paid payment instrument) to a delivery agent associated with an article and/or order delivery entity engaged in delivering articles or items (e.g., food items) to consumers. The delivery agent can use the pre-paid payment instrument for making payment to merchants on behalf of the customers in cash on delivery (or 'payment at the time of delivery') type of purchase, and the delivery agent can collect the payment from the customer after the successful delivery of the delivery items to the customer. The server system can either be implemented in a payment server, associated with a particular payment server, or can be a standalone server acting as a hub for providing payment services involving different payment servers. Once a customer places an order from a merchant (or restaurant) using an order delivery application (managed by the order delivery entity), the delivery agent receives order related data in a delivery agent application. The order delivery entity linked with the delivery agent application is in communication with the server system and provides the order related data to the server system.

The server system validates the order related data. The order related data includes a payment transaction amount to be paid by the customer in pay-on-delivery (POD) mode, merchant identifier associated with the merchant and information related to pre-paid payment instrument of the delivery agent. Thereafter, the server system validates the order related data and determines credit the payment transaction amount to the pre-paid payment instrument based on certain rules. More specifically, the server system determines, if the payment transaction amount is within one or more transaction threshold limits or not, prior to initiating a credit transaction to the pre-paid payment instrument. Upon determining the payment transaction amount is within the one or more transaction threshold limits, the server system initiates the transfer of the payment transaction amount to the pre-paid payment instrument of the delivery agent. The server system generates a unique reference identifier for the corresponding credit transaction and provides the unique reference identifier as part of an authentication response message to the issuer for the storage of the unique reference identifier.

Thereafter, the delivery agent presents the payment instrument at the merchant location to make payment to the merchant on behalf of the customer for the order on pay-on-delivery mode. In this scenario, a payment transaction request is sent to the payment server via an acquirer associated with the merchant (i.e. the restaurant). The payment server identifies the payment transaction is linked with the pre-paid payment instrument based at least on the information of the payment instrument present in the payment transaction request. The payment server transmits the payment transaction request to the server system for validation. The server system validates the received payment transaction request against the earlier approved transaction request (i.e. authentication response message) while crediting the payment transaction amount to the pre-paid payment instrument. Upon successful validation, the server system transmits a payment authorization request message to the issuer by appending the order related data and the unique reference identifier. The issuer authorizes the payment transaction based at least on the unique reference identifier and enables transfer of the payment transaction amount from the pre-paid payment instrument to the merchant.

Various embodiments of the present disclosure offer multiple advantages and technical effects. For instance, the present disclosure creates a cashless transaction based system for handling pay-on-delivery orders to transparent the delivery process and makes the delivery process digitized. The present disclosure provides means for cashless transaction for delivery agents at a merchant while paying the order amount to the merchant. The present disclosure introduces a data element with a unique reference identifier in a payment authorization request message to indicate that the involved payment instrument is associated with the delivery agent and is loaded with the order transaction amount in authentication stage. The authorization process for such transactions can be done by matching the data element with stored data element that was received upon crediting the order transaction amount in the payment instrument. Based on the description herein the technical improvement in the delivery based system as described herein is a computer based solution to a technical deficiency or problem that is itself rooted in computer technology (e.g., the problem itself derives from the use of computer technology). More specifically, fraud is significant problem for transactions conducted over an electronic payment network, especially for delivery based transactions. Therefore, there is a need of a system for reducing cash interference in delivery based payments at merchants such that the reduction in handling cash and reconciliation costs is achieved.

Various example embodiments of the present disclosure are described hereinafter with reference to FIGS. 1 to 11.

FIG. 1 illustrates an exemplary representation of an environment 100 related to at least some example embodiments of the present disclosure. Although the environment 100 is presented in one arrangement, other embodiments may include the parts of the environment 100 (or other parts) arranged otherwise depending on, for example, facilitating a payment transaction of an order to a merchant using a payment instrument of a delivery agent on behalf of customer in pay-on-delivery (POD) transactions. The environment 100 depicts a user 102 (hereinafter interchangeably referred to as "a delivery agent 102") associated with a user device 104 (e.g., a mobile phone) and a customer 126 associated with a customer device 128. The environment 100 also depicts an issuer server 108, an acquirer server 110, a payment server 112, a server system 114, and an order delivery entity 118 where these entities communicate with each other via a network 124. In one embodiment, the payment server 112 is associated with a payment network 116.

Various entities in the environment 100 may connect to the network 124 in accordance with various wired and/or wireless communication protocols, such as, Transmission Control Protocol and Internet Protocol (TCP/IP), User Datagram Protocol (UDP), $2^{nd}$ Generation (2G), $3^{rd}$ Generation (3G), $4^{th}$ Generation (4G), $5^{th}$ Generation (5G) communication protocols, Long Term Evolution (LTE) communication protocols, or any combination thereof. The network 124 may include, without limitation, a local area network (LAN), a wide area network (WAN) (e.g., the Internet), a mobile network, a virtual network, and/or another suitable public and/or private network capable of supporting communication among two or more of the entities illustrated in FIG. 1, or any combination thereof. For example, the network 124 may include multiple different networks, such as a private network made accessible by the payment network 116 to the issuer server 108 and the acquirer server 110 and separately, a public network (e.g., the Internet) through which the issuer server 108, the acquirer server 110, and the payment server 112 may communicate.

The environment 100 includes the server system 114 configured to perform one or more of the operations described herein. In one embodiment, the server system 114 works as a prepaid hub that handles all the pay-on-delivery transactions and loads order transaction amount into a payment instrument of the delivery agent selected for delivering an order. Thereby, the delivery agent can perform online transaction at payment terminal of a merchant on behalf of the customer. The server system 114 is configured to generate a unique reference identifier for processing a credit transaction to the payment instrument 106 and facilitate the payment transaction associated with the payment instrument 106 of the delivery agent 102 and the merchant (associated with the acquirer server 110). In an embodiment, the server system 114 can be a component closely linked with the payment server 112, for example the server system 114 only caters to the payment requests that are associated with the payment server 112. In another embodiment, the server system 114 operates independently of the payment server 112, and it can operate with requests associated with any kinds of payment server 112, even if the server system 114 is associated with a particular payment server or not. Further, in some other embodiments, the server system 114 may actually be incorporated, in whole or in part, into one or more entities shown in the environment 100, for example, the payment server 112, the issuer server 108 and/or the acquirer server 110. In addition, the server system 114 should be understood to be embodied in at least one computing device in communication with the network 124, which may be specifically configured, via executable instructions, to perform as described herein, and/or embodied in at least one non-transitory computer readable media.

In one embodiment, the acquirer server 110 is associated with a financial institution (e.g., a bank) that processes the financial transactions. This can be an institution that facilitates the processing of payment transactions for physical stores, merchants (e.g., restaurants) that are tied up with the software applications managed by the delivery entities for enabling a hassle-free experience for the customers (e.g., the customer 126) to order items and/or articles from the merchants.

In the illustrative embodiment, the user 102 may be the delivery agent 102 who is an employee of the order delivery entity. The delivery agent 102 is associated with a pre-paid payment instrument 106 (exemplarily depicted to be a payment card) for performing the payment transaction with the merchant on behalf of the customer 126 as explained above. Particularly, the order delivery entity may have a payment account issued by an issuing bank (associated with the issuer server 108).

In one embodiment, the issuer server 108 is associated with a financial institution normally called as an "issuer bank" or "issuing bank" or simply "issuer", in which the order delivery entity may have a payment account and also issues the payment instrument 106 to the delivery agents associated with the order delivery entity. The issuer server 108 provides banking services (e.g., payment transaction using the payment instrument 106) for processing electronic payment transactions to the delivery agent such as, the delivery agent 102.

The payment server 112 is associated with the payment network 116, where the payment network 116 may be used by the payment cards (or the payment instrument) issuing authorities as a payment interchange network. Examples of the payment interchange network include, but not limited to, Mastercard® payment system interchange network. The Mastercard® payment system interchange network is a proprietary communications standard promulgated by Mastercard International Incorporated® for the exchange of financial transaction data between financial institutions that are members of Mastercard International Incorporated®. (Mastercard is a registered trademark of Mastercard International Incorporated located in Purchase, N.Y.).

In one example, the order delivery entity 118 may be an entity who delivers food items from merchant location (such as the restaurants) to its customers. Specifically, the customers (such as the customer 126) may place an order of food items from a particular restaurant that is tied up with the order delivery entity 118 via an order delivery application 130 (hosted and managed by the order delivery entity 118) equipped in the customer device 128. Typically, the order delivery entity 118 receives the order related to food items placed by the customer 126 with the merchant (e.g., the restaurant) through the order delivery application 130 and routes the order related data to the delivery agent application 120 for allowing the delivery agent 102 to deliver the order from the merchant location to the customer 126.

For description purpose, the present disclosure is described with reference to the order delivery entity 118 being an entity associated with delivering the food items from a merchant location (or the restaurant) to the customers, and therefore it should not be considered to limit the scope of the present disclosure. In another embodiment, the order delivery entity 118 may be any entity who is responsible for delivering articles such as, groceries, furniture, pharmacy products, and the like.

As explained above, the delivery agent 102 is assigned with the order by the order delivery entity 118 based on receipt of the order from the customer 126 through the order delivery application 130. More specifically, a parameter may be set by the order delivery entity 118 for allowing the customer 126 to place the order from the restaurants within a particular geographical area (e.g., within 7-10 kilometers). Thereafter, the order delivery entity 118 is configured to determine the delivery agent (such as the delivery agent 102) who is in vicinity of the restaurant in which the customer 126 has placed the order and routes the order details to the delivery agent 102. In this scenario, the delivery agent 102 provides input in the delivery agent application 120 (hereinafter interchangeably referred to as "the application 120) for accepting and/or confirming the order upon verifying the order details.

In one scenario, the customer 126 may opt pay-on-delivery (POD) mode while placing the order with the restaurant (and/or the merchant). In such a scenario, the delivery agent 102 is notified in the application 120 for using the payment instrument 106 for paying the payment transaction amount to the merchant on behalf of the customer 126. Thus, the delivery agent 102 provides an input in the application 120 for confirming the order and accepting usage of the payment instrument 106 for paying towards the order on POD mode to the merchant.

Based on order confirmation, the order delivery entity 118 routes order related data to the server system 114 using one or more application programming interface (API). The order related data may include the payment transaction amount to be paid by the customer 126 in pay-on-delivery (POD) mode, merchant identifier associated with the merchant and information of the payment instrument 106. The server system 114 validates the order related data and determines if the payment transaction amount is within one or more transaction threshold limits. If the payment transaction amount is determined to be within the transaction threshold limits, the server system 114 facilitates the issuer server 108 to initiate a credit transaction for effectuating a transfer of the payment transaction amount from the account of the order delivery entity 118 to the payment instrument 106 of the delivery agent 102 on real-time. Further, the server system 114 assigns the unique reference identifier for the credit transaction and transmits the unique reference identifier for authorizing the payment transaction initiated by the payment instrument 106 for paying towards the order on POD mode to the restaurant.

Upon successful credit transaction, the delivery agent 102 may use the payment instrument 106 at a point of sale (POS) terminal 122 or a payment terminal 122 (associated with the acquirer server 110) present at the restaurant for paying the payment transaction amount associated with the order to the restaurant. Upon successful payment, the delivery agent 102 proceeds to complete the order by delivering the food items to the customer 126 and in turn receives the payment (or the order amount) either in cash, or any digital methods from the customer 126.

The number and arrangement of systems, devices, and/or networks shown in FIG. 1 are provided as an example. There may be additional systems, devices, and/or networks; fewer systems, devices, and/or networks; different systems, devices, and/or networks, and/or differently arranged systems, devices, and/or networks than those shown in FIG. 1. Furthermore, two or more systems or devices shown in FIG. 1 may be implemented within a single system or device, or a single system or device shown in FIG. 1 may be implemented as multiple, distributed systems or devices. Additionally, or alternatively, a set of systems (e.g., one or more systems) or a set of devices (e.g., one or more devices) of the environment 100 may perform one or more functions described as being performed by another set of systems or another set of devices of the environment 100.

Figure 2A:
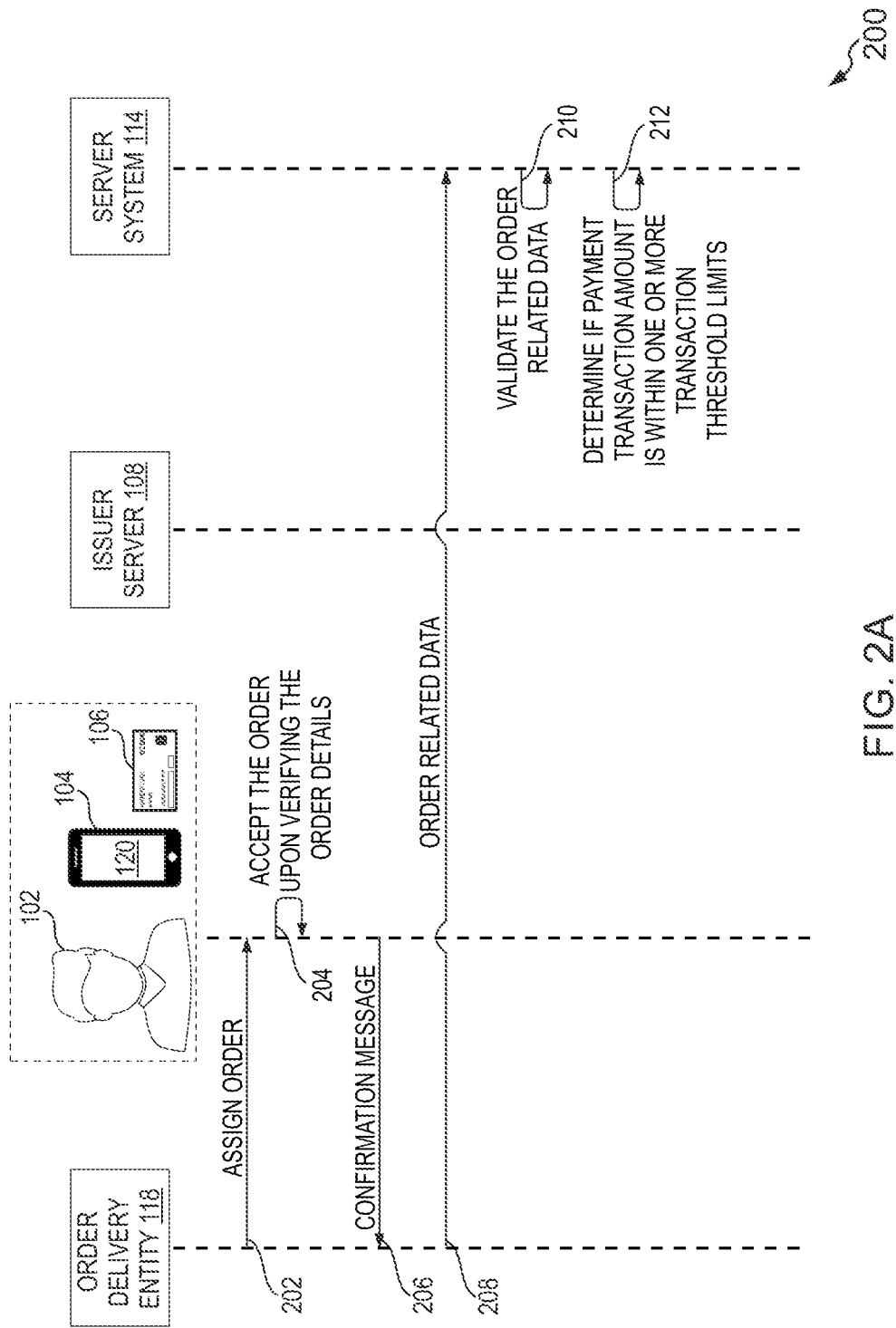
FIGS. 2A and 2B, collectively, represent a sequence flow diagram for authenticating a payment transaction to credit requested payment transaction amount to a payment instrument of a delivery agent, in accordance with an example embodiment of the present disclosure.
Figure 2B:
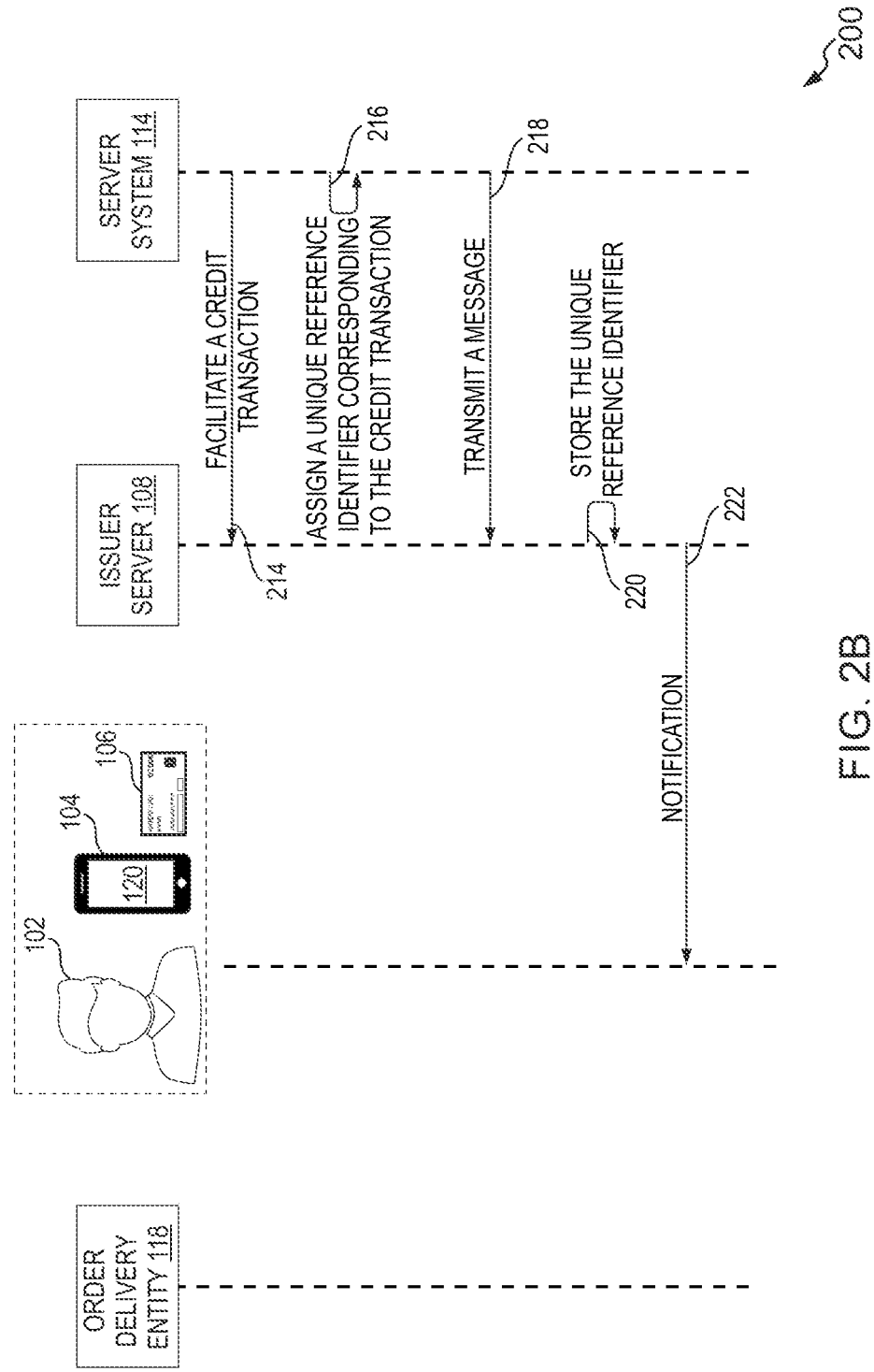

FIGS. 2A and 2B, collectively, represent a sequence flow diagram 200 for authenticating the payment transaction to credit a payment transaction amount to the payment instrument 106 of the delivery agent 102, in accordance with an embodiment of the present disclosure. The sequence of operations of the sequence flow diagram 200 may not be necessarily executed in the same order as they are presented. Further, one or more operations may be grouped together and performed in form of a single step, or one operation may have several sub-steps that may be performed in parallel or in sequential manner.

The sequence flow diagram 200 is executed when the customer 126 places an order with a merchant "XYZ" on order delivery application 130. The order may be placed via the Internet, phone, fax, mail or any other remote means. For example, the customer 126 uses his or her computer device to make an order of merchandise online via a web site of the merchant. It is noted that the ordered merchandise may be goods and/or services. In case of the ordered merchandise is a service, the merchant could be a service provider. For example, when the order is made, the customer 126 may be prompted to use a pay-on-delivery mode to complete the order. In one example, the customer "A" places a food order with a merchant "XYZ" on a food delivery application in pay-on delivery mode.

At 202, upon receiving the order from the customer 126, the order delivery entity 118 identifies one or more delivery agents that can deliver the order to the customer 126. The order delivery application 130 is managed by the order delivery entity 118. Thereafter, the order delivery entity 118 selects the delivery agent 102 located at the vicinity of the merchant location and assigns the order placed from the customer 126 to the delivery agent 102 for delivering the order from the merchant location to the customer 126. In other words, the order delivery entity 118 routes the order related data (i.e. the food order placed by the customer 126) to the delivery agent application 120 installed in the user device 104 of the delivery agent 102.

At 204, the delivery agent 102 accepts the order for delivering by providing inputs in the delivery agent application 120.

In the above example, prior to accepting the order (i.e. the food order), the delivery agent 102 may verify details associated with the food order such as, but not limited to, order details including merchant/restaurant name, the merchant location, food items, mode of payment, payment transaction amount to be paid to the merchant, and the like.

At 206, a confirmation message may be transmitted in real-time to the order delivery entity 118 by the application 120, upon accepting the order. The confirmation message indicates the order delivery entity 118 about acceptance of the order by the delivery agent 102. In an example scenario, the customer 126 may place the order using the POD mode. In this scenario, the confirmation message indicates the order delivery entity 118 about the acceptance of the order and use of the payment instrument 106 to pay towards the order (received by the customer 126 on POD mode) to the merchant. It should be noted that the account balance associated with the payment instrument 106 is zero. The payment instrument 106 is generally referred as zero balance pre-paid card. Thus, the confirmation message also indicates the order delivery entity 118 about credit of the payment transaction amount associated with the order into the payment instrument 106 for paying the merchant towards the order received on POD mode.

At 208, the order delivery entity 118 transmits the order related data to the server system 114. The order delivery entity 118 is communicably coupled to the issuer server 108, and is configured to store information of the payment instrument 106. Based on receipt of the confirmation message, the order delivery entity 118 retrieves the information of the payment instrument 106 such as payment card number, expiry date, a transaction limit associated with the payment instrument 106 and the like. Thereafter, the order delivery entity 118 transmits the order related data by appending the payment transaction amount to be paid by the customer 126 in POD mode, merchant identifier associated with the merchant (i.e. merchant name) and information of the payment instrument 106 associated with the delivery agent 102 to the server system 114.

At 210, the server system 114 validates the order related data. More specifically, the server system 114 validates bank identification number (BIN), the payment card number, expiry date, the payment transaction amount, the merchant identifier and the like. In an embodiment, the server system 114 is configured to identify the type of transaction (i.e.

transaction associated with the pre-paid payment instrument 106) based on the BIN of the payment instrument 106. The 4-digit BIN number may be assigned by the issuer server 108 while issuing the payment instrument 106 to the delivery agent 102 to demarcate or identify the transaction initiated by the payment instrument 106.

At 212, the server system 114 determines if the payment transaction amount associated with the order is within the one or more transaction threshold limits. The transaction threshold limits include one of the transaction limit associated with the payment instrument 106 for a particular time period (e.g., daily basis) and an overall pool amount registered and/or deposited by the order delivery entity 118 for a time period (e.g., weekly basis, daily basis etc.) in the account managed by the issuer server 108. The issuer server 108 communicates the transaction threshold limits to the server system 114 for processing the payment transaction associated with the payment instrument 106. The server system 114 compares the payment transaction amount with the transaction limit associated with the payment instrument 106 and the overall pool amount set by the order delivery entity 118 with the issuer server 108. The server system 114 if the payment transaction amount is within the transaction limit associated with the payment instrument 106 and the overall pool amount. For instance, the transaction limit associated with the payment instrument 106 may be set as "100 dollars per day", and the payment transaction amount may be "10 dollars" associated with the order (e.g., the food order) placed by the customer 126. In this scenario, the sever system 114 approves the payment transaction, as the payment transaction amount is determined to be within the transaction limit of the payment instrument 106. The order delivery entity 118 may deposit the overall pool amount of 1,00,000 USD on a weekly basis in the issuer bank "ABC BANK" associated with the issuer server 108. The server system 114 will allow the payment transactions across the plurality of delivery agents of the order delivery entity 118 until the overall pool amount parked by the order delivery entity 118 with the issuer bank is exhausted.

At 214, the server system 114 facilitates a credit transaction by the issuer server 108 for effectuating a transfer of the payment transaction amount from the account of the order delivery entity 118 to the payment instrument 106 of the delivery agent 102 on real-time or as per pre-defined schedule. More specifically, the server system 114 populates corresponding data field of a plurality of data fields with a value upon determining the payment transaction amount is within the transaction threshold limits. The data field is a message triggered by the server system 114 to credit the payment transaction amount to the payment account associated with the payment instrument 106. In this scenario, the payment transaction amount (e.g., 10 dollars) is credited to the payment instrument 106 for enabling the delivery agent 102 to pay towards the order at the restaurant.

In one example scenario, the overall pool amount earmarked by the order delivery entity 118 with the issuer server 108 may be exhausted. In such scenario, the server system 114 transmits a response message by populating a data field with corresponding value to the issuer server 108, and thereby declines the credit transaction associated with the payment instrument 106.

At 216, the server system 114 assigns a unique reference identifier corresponding to the credit transaction. Further, the server system 114 may store the order related data and the unique reference identifier assigned to the credit transaction in a database associated with the server system 114.

At 218, the server system 114 transmits a message by appending the unique reference identifier to the issuer server 108. At 220, the issuer server 108 stores the unique reference identifier received in the message in a database. The issuer server 108 is further configured to use the unique reference identifier for authorizing the payment transaction which will be explained with reference to FIGS. 3A and 3B. At 222, the issuer server 108 may transmit a notification to a mobile phone number of the delivery agent 102 linked to the payment account. The issuer server 108 may transmit the notification to the mobile phone number of the delivery agent 102 via a short message service (SMS) medium or any other suitable medium such as multimedia message or any other messaging application. The notification indicates the credit of the payment transaction amount to the payment instrument 106 of the delivery agent 102. In an example scenario, the issuer server 108 may transmit the notification to the application 120 via the order delivery entity 118.

Additionally, the issuer server 108 may share a report to the server system 114 on a periodic basis (e.g., daily basis). The report includes number of payment instruments issued across the plurality of delivery agents, and the information and the transaction limit assigned to each of the payment instruments. Also, the issuer server 108 transmits a notification indicating status of the payment instruments (either stolen, lost, cancelled or revoked) to the server system 114 on a periodic basis (e.g., daily basis). The server system 114 is configured to terminate and/or delete the respective payment instrument based at least on determining the status of the payment instrument to be one of lost or revoked or cancelled.

Figure 3A:
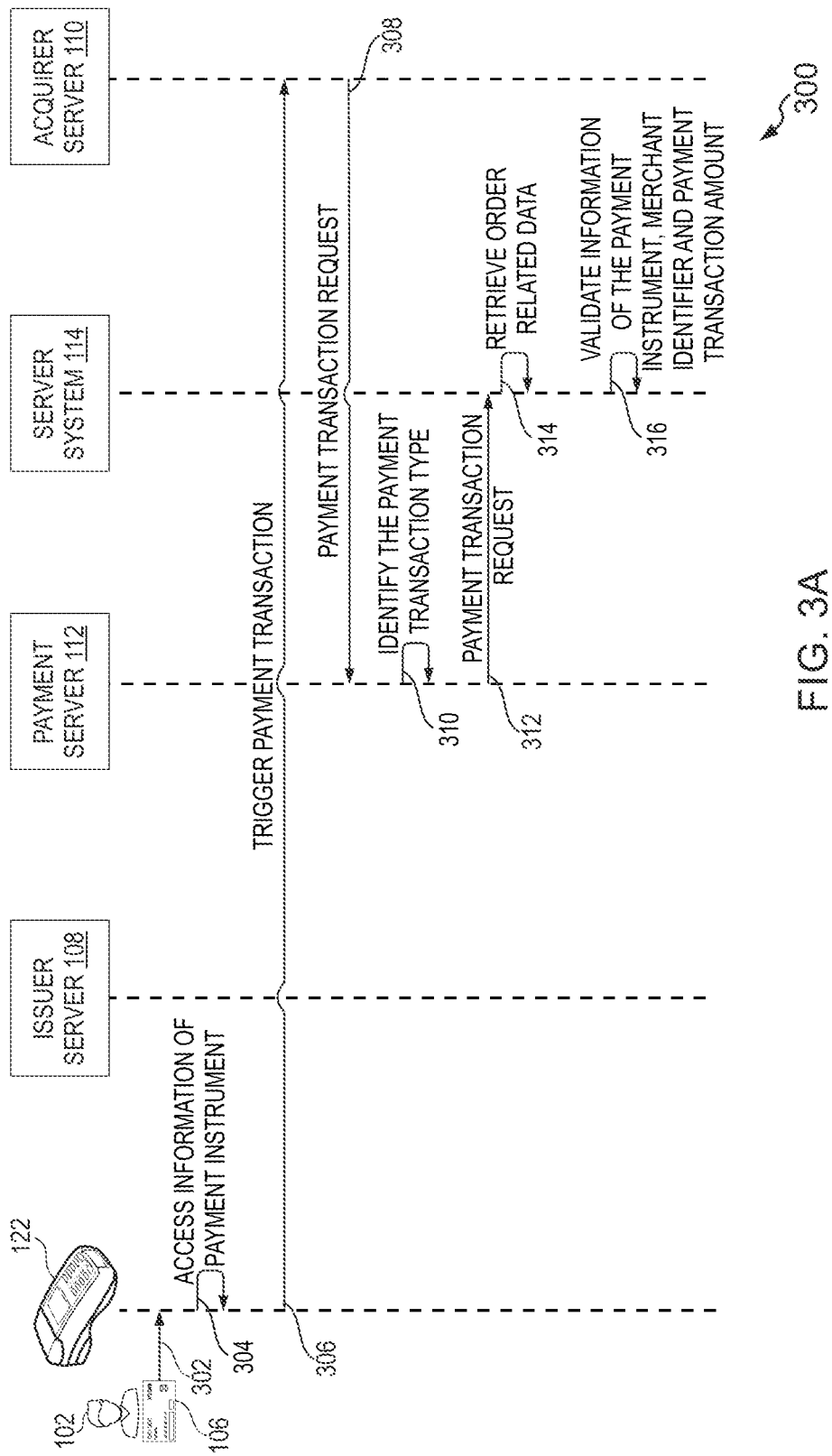
FIGS. 3A and 3B, collectively, represent a sequence flow diagram for authorizing the payment transaction to pay towards the order on pay-on-delivery (POD) mode by using the payment instrument, in accordance with an example embodiment of the present disclosure.
Figure 3B:
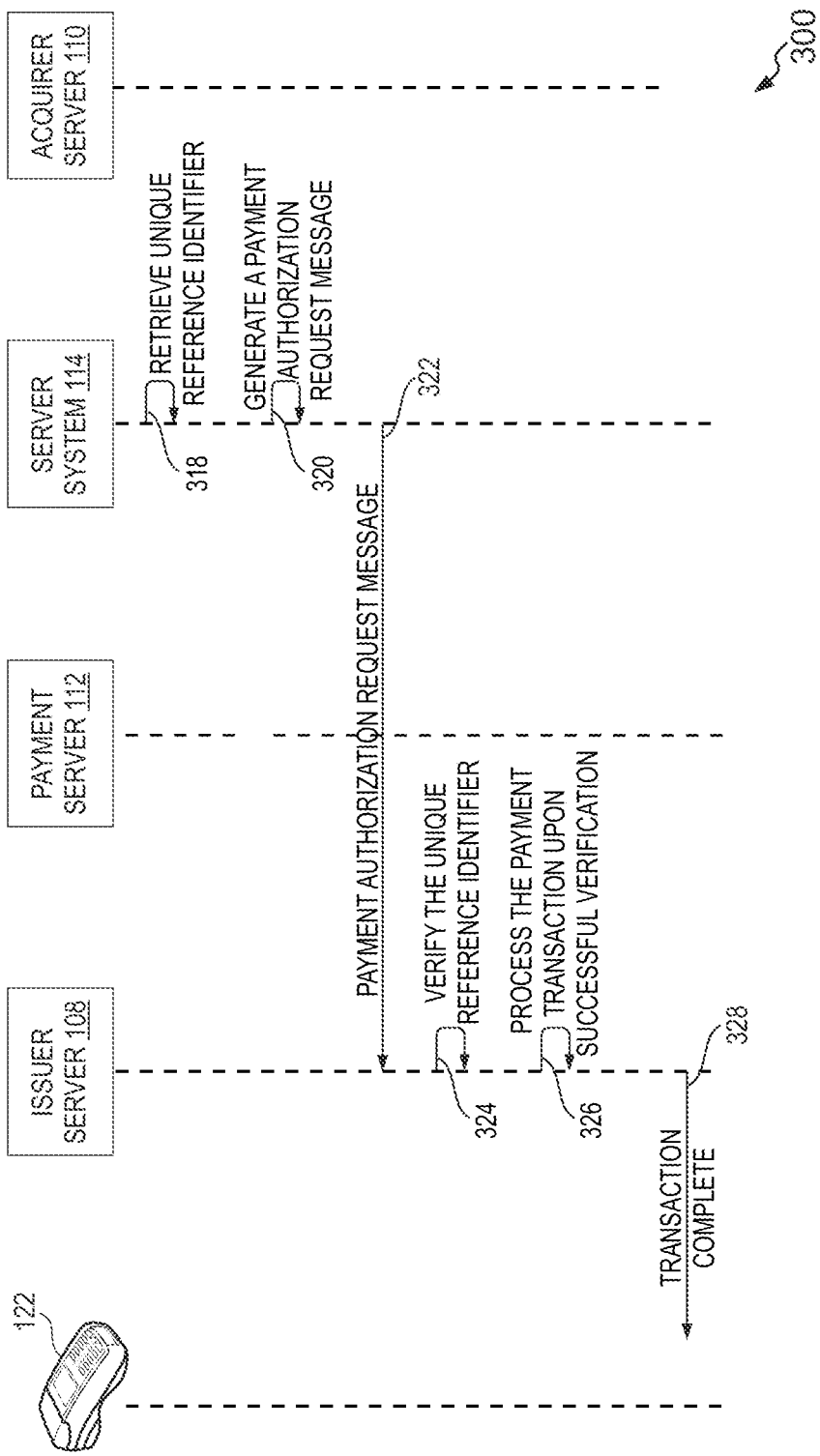

FIGS. 3A and 3B, collectively, represent a sequence flow diagram 300 for authorizing the payment transaction to pay towards the order on POD mode by using the payment instrument 106, in accordance with an example embodiment of the present disclosure. The sequence of operations of the sequence flow diagram 300 may not be necessarily executed in the same order as they are presented. Further, one or more operations may be grouped together and performed in form of a single step, or one operation may have several sub-steps that may be performed in parallel or in sequential manner.

The sequence flow diagram 300 explains an authorization process when the payment instrument 106 is pre-credited with a payment transaction amount of the order placed by the customer.

At 302, the delivery agent 102 presents the payment instrument 106 at the payment terminal 122 (or the POS terminal 122) associated with the merchant (i.e. the restaurant). The delivery agent 102 visits the merchant location for collecting the order from the merchant upon receipt of the notification related to credit of the payment transaction amount in the payment account associated with the payment instrument 106. Based on the above example, the delivery agent 102 may visit the merchant "XYZ" (or the restaurant) for collecting the food order placed by the customer 'A'. The delivery agent 102 uses the payment instrument 106 with a payment card number "2227XXXX0000XXX" belonging to an issuer (i.e. the issuer server 108) at the payment terminal 122 located at the restaurant for paying the payment transaction amount of the order to the restaurant. It should be noted that the first four digits of the payment card number (i.e. "2227") represent the BIN or an issuer identifier of the issuer bank 108.

At 304, the payment terminal 122 associated with the acquirer server 110 accesses the information associated with the payment instrument 106 such as the payment card number, BIN, expiry date etc. At 306, the payment terminal 122 triggers the payment transaction by transmitting the information associated with the payment instrument 106 along with the merchant identifier (i.e. restaurant name and restaurant city) and the payment transaction amount to the acquirer server 110.

At 308, the acquirer server 110 initiates the payment transaction by transmitting a payment transaction request to the payment server 112. More specifically, the acquirer server 110 identifies the payment server (such as the payment server 112) associated with the issuer server 108 based at least on the BIN of the payment instrument 106. Thereafter, the acquirer server 110 routes the payment transaction request by appending the information of the payment instrument 106, the merchant identifier and the payment transaction amount to the payment server 112.

At 310, the payment server 112 identifies a payment transaction type based on the information of the payment instrument 106 present in the payment transaction request. More specifically, the payment server 112 determines the payment transaction to be associated with the payment instrument 106 based on the BIN (i.e. "2227") of the payment instrument 106 present in the payment transaction request. At 312, the payment server 112 routes the payment transaction request to the server system 114.

At 314, the server system 114 retrieves the previously stored order related data from the database associated with the server system 114 based on receipt of the payment transaction request. More specifically, the server system 114 analyzes the information appended in the payment transaction request and runs a query for retrieving the order related data from the database.

At 316, the server system 114 validates the information of the payment instrument 106, the merchant identifier and the payment transaction amount appended in the payment transaction request with the order related data. As explained above, the order related data includes the information of the payment instrument 106, the merchant identifier and the payment transaction amount. The server system 114 compares the details appended in the payment transaction request with the order related data.

At 318, the server system 114 retrieves the unique reference identifier based on determining a match between the information of the payment instrument 106, the merchant identifier and the payment transaction amount, and the order related data. Further, if there is a mismatch in either of the payment card details, the merchant details and the order amount, the server system 114 declines the payment transaction.

At 320, the server system 114 generates a payment authorization request message by populating the data fields with corresponding values based at least on the order related data (information of the payment instrument 106, the merchant identifier, and the payment transaction amount) and the unique reference identifier. The server system 114 generates the payment authorization request message based at least on determining the match between the information of the payment instrument 106, the merchant identifier and the payment transaction amount, and the order related data.

At 322, the server system 114 transmits the payment authorization request message to the issuer server 108.

At 324, the issuer server 108 verifies the unique reference identifier received in the payment authorization request message with the previously received unique reference identifier in the message. The issuer server 108 with access to a database, retrieves the unique reference identifier assigned to the payment transaction (to be performed using the payment instrument 106) during the authentication stage. Thereafter, the issuer server 108 compares the unique reference identifier with the unique reference identifier of the payment authorization request message.

At 326, the issuer server 108 processes the payment transaction based on successful verification. More specifically, the payment transaction amount is debited from the payment instrument 106 and credited to the account of the merchant (i.e. the restaurant) associated with the acquirer server 110. The payment transaction completes at operation 328. It should be noted that the balance associated with the payment instrument 106 is zero, as the payment transaction amount is debited from the payment instrument 106 and credited to the payment account of the merchant.

Thereafter, the delivery agent 102 receives the order (i.e. the food order) from the restaurant and proceeds to deliver the order to the customer 126. The delivery agent 102 in turn receives the payment transaction amount from the customer 126 opted for POD payment mode either with cash or through digital methods for completing the order.

In one example scenario, the customer 126 may cancel the order post the credit transaction associated with the payment instrument 106 or anytime upon placing the order with the merchant. In such scenarios, the payment transaction amount credited to the payment instrument 106 may persist (or remain unutilized) in the payment account of the payment instrument 106 as the credit transaction was assigned with a unique identifier (such as the unique reference identifier). In other words, the payment instrument 106 credited with the payment transaction amount is prohibited to perform any payment transaction. Further, the issuer server 108 may set a parameter to purge unutilized amount in the payment instrument 106 on a regular basis (e.g., at 12.00 a.m. everyday). In other words, the issuer server 108 may revert the unused amount in the payment instrument 106 to the overall pool amount associated with the order delivery entity 118 (i.e. reconciliation process) and also update the transaction limit associated with the payment instrument 106 on a periodic basis.

FIG. 4 illustrates an example representation of a table 400 depicting the data fields for processing (i.e. authentication and authorization) of the payment transaction associated with the payment instrument 106, in accordance with an example embodiment of the present disclosure. In one embodiment, the payment authorization request message includes a plurality of data elements. The plurality of data elements may include, but is not limited to, BIN of the card issuer of the payment card, a payment transaction identifier, a payment transaction amount, a payment transaction date/time, a payment transaction terminal identifier, a merchant name and location, an acquirer identifier etc. In one embodiment, the payment transaction request may be an electronic message that is sent via the server system 114 or the payment server to the card issuer of the payment card to request authorization for a payment transaction. The payment authorization request message may comply with a message type defined by an International Organization for Standardization (ISO) 8583 standard, which is a standard for systems that exchanges electronic transaction information associated with payments made by users using the payment card, or the payment account. In one example, an ISO 8583 transaction message may include one or more data elements that store data usable by the server system 108 to communicate information such as transaction requests, responses to transaction requests, inquiries, indications of fraud, security information, or the like.

As explained above, the server system 114 populates the data fields based on receipt of the order related data for processing the payment transaction linked with the payment instrument 106 for generating the payment authorization request. The table 400 is depicted to include three columns 402, 404, and 406 for the data fields, description of the data fields and purpose of the data fields, respectively. In an embodiment, the data fields may include at least a data element (DE), sub element (SE), and a sub-field (sf).

The column 402 of the data fields of the table 400 is depicted to include entries, such as, "DE 002", "DE 004", "DE 043", "DE 003", "DE 48 SE 41 sf2", and "DE 039".

In one example embodiment, the data field "DE 002" represents the payment card number associated with the payment instrument 106. For example, the data field "DE 002" may be assigned with the payment card number (e.g., 2227XXXX0000XXXX) by the server system 114 based on receipt of the order related data. The payment server 112 or the server system 114 may identify the transaction initiated by the payment instrument 106 based on comparing the information of the payment instrument 106 from the payment terminal 122 with the information of the payment instrument 106 (i.e. payment card number) assigned in the data field "DE 002". Additionally, the server system 114 may populate the data field "DE 002" with the payment card number based on receipt of the report related to issuance of new payment instruments to the delivery agents, from the issuer server 108. Thus, the server system 114 stores the information of the payment instruments in the database for future use (i.e. for authorizing the payment transaction). The server system 114 is also configured to delete the information of the payment instrument 106 from the data field "DE 002", based on receipt of the notification indicating the status to be either stolen, lost or cancelled.

Further, the data field "DE 004" is assigned with the payment transaction amount received in the authentication request message. The server system 114 may compare the payment transaction amount populated in data field "DE 004" with the transaction limit associated with the payment instrument 106 for the time period (e.g., daily basis) and the overall pool amount. Further, the server system 114 compares the payment transaction amount in the data field "DE 004" with the transaction amount entered at the payment terminal 122 for processing and/or authorizing the payment transaction.

The data field "DE 043" is populated with the merchant identifier (i.e. merchant name, merchant city etc.) based on receipt of the order related data. The data field "DE 043" enables the server system 114 to identify the merchant identifier during the authorization process.

The data field "DE 003" is assigned with a value based on successful validation of the transaction threshold limits (i.e. the transaction limit of the payment instrument 106 and the overall pool amount) for processing the credit transaction. For example, the server system 114 may assign a value (i.e. processing code) '20' in the data field "DE 003" in order to credit the payment transaction amount to the payment instrument 106.

The data field "DE 48 SE 41 sf2" is populated with the unique reference identifier corresponding to the credit transaction. The data field "DE 48 SE 41 sf2" is used by the server system 114 and the issuer server 108 for populating with the unique reference identifier upon credit of the payment transaction amount to the payment instrument 106 by the issuer server 108. The unique reference identifier is appended in the payment authorization request message to indicate that the payment transaction is performed using the pre-paid payment instrument of the delivery agent 102 at the merchant.

The data field "DE 039" is assigned with a value based on determining the overall pool amount deposited by the order delivery entity 118 to be exhausted. For example, the server system 114 may assign a value (i.e. response code) '05' in the data field "DE 039", if the overall pool amount is exhausted and declines the credit transaction request.

Figure 5:
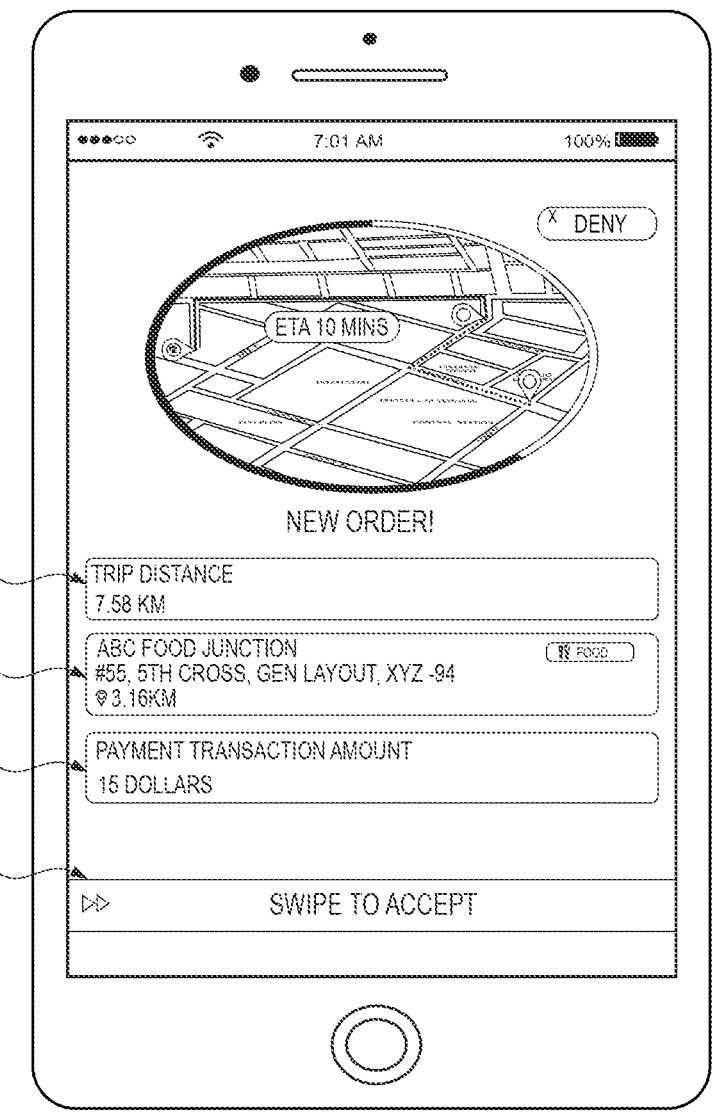
FIG. 5 illustrates an example representation of a user interface (UI) depicting an order assigned to the delivery agent, in accordance with an embodiment of the present disclosure.

FIG. 5 illustrates an example representation of a user interface (UI) 500 depicting an order (i.e. food order) assigned to the delivery agent 102, in accordance with an embodiment of the present disclosure. The UI 500 is depicted at the delivery agent application 120 equipped in the user device 104 of the delivery agent 102. As shown, the UI 500 is depicted to include details related to the food order placed by the customer (such as the customer 126) with the merchant (i.e. the restaurant). The UI 500 is depicted to include an information field 502, and information field 504. The information field 502 depicts information related to a total trip distance (exemplarily depicted to be '7.58 km') the delivery agent 102 has to travel for delivering the food order from the merchant location to the location of the customer 126. The information field 504 depicts information related to the merchant identifier such as the merchant name, and merchant location. Further, the UI 500 is depicted to include an information field 506. The information field 506 is depicted to include the payment transaction amount (exemplarily depicted to be '15 dollars'). It is to be noted that the information field 506 is depicted in the UI 500, when the customer 126 has opted POD mode for the corresponding order. As such, the delivery agent 120 verifies the information depicted in the UI 500 and provides input (i.e. gesture input or tap or click) on an actionable button 508 for accepting the order and using the payment instrument 106 for paying the merchant for the order on behalf of the customer 126.

Figure 6:
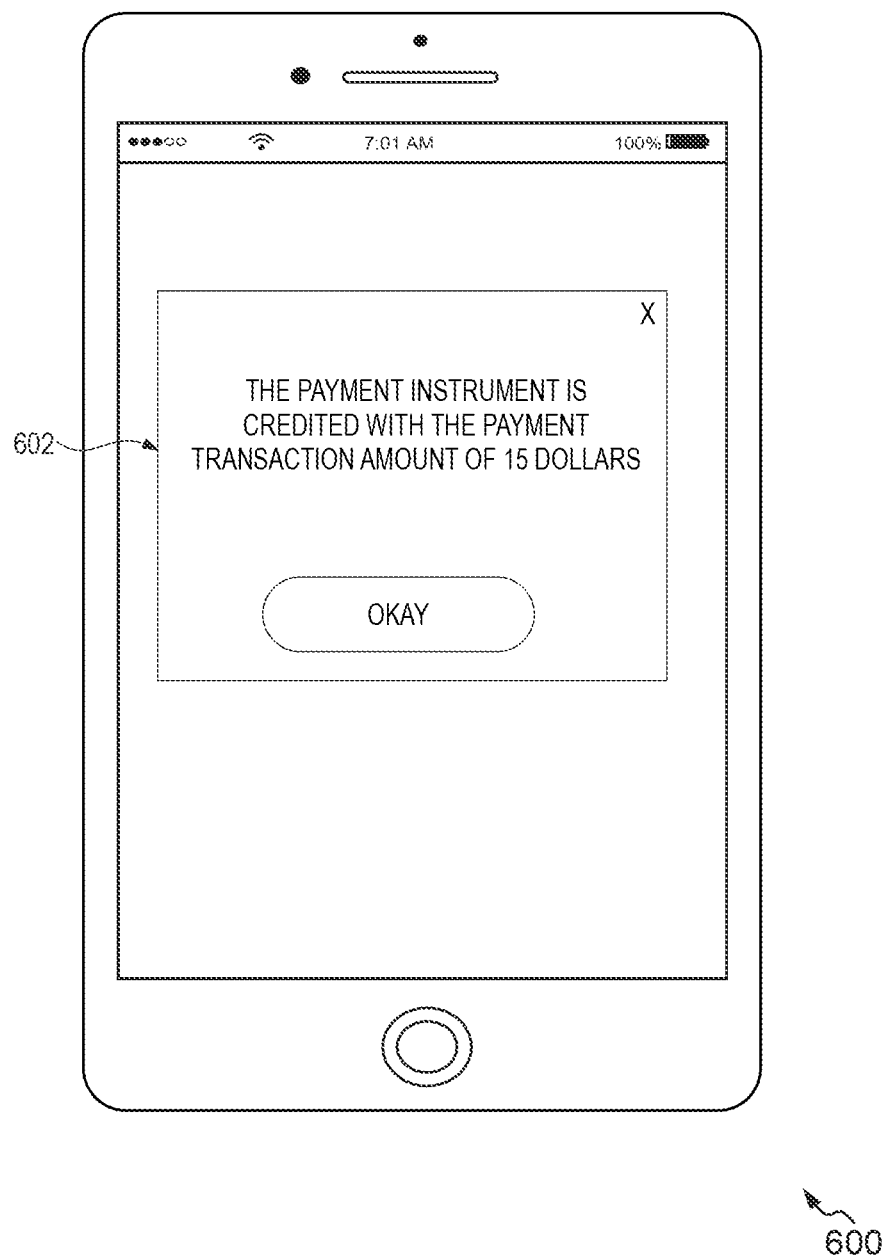
FIG. 6 illustrates an example representation of a user interface (UI) depicting a notification related to credit of the payment transaction amount, in accordance with an embodiment of the present disclosure.

FIG. 6 illustrates an example representation of a user interface (UI) 600 depicting a notification 602 related to credit of the payment transaction amount, in accordance with an embodiment of the present disclosure. The payment instrument 106 is credited with the payment transaction amount based on providing input on the actionable button 508. Further, the delivery agent 102 is depicted with the UI 600 for notifying the delivery agent 102 about the credit of the payment transaction amount in the payment instrument 106.

Figure 7:
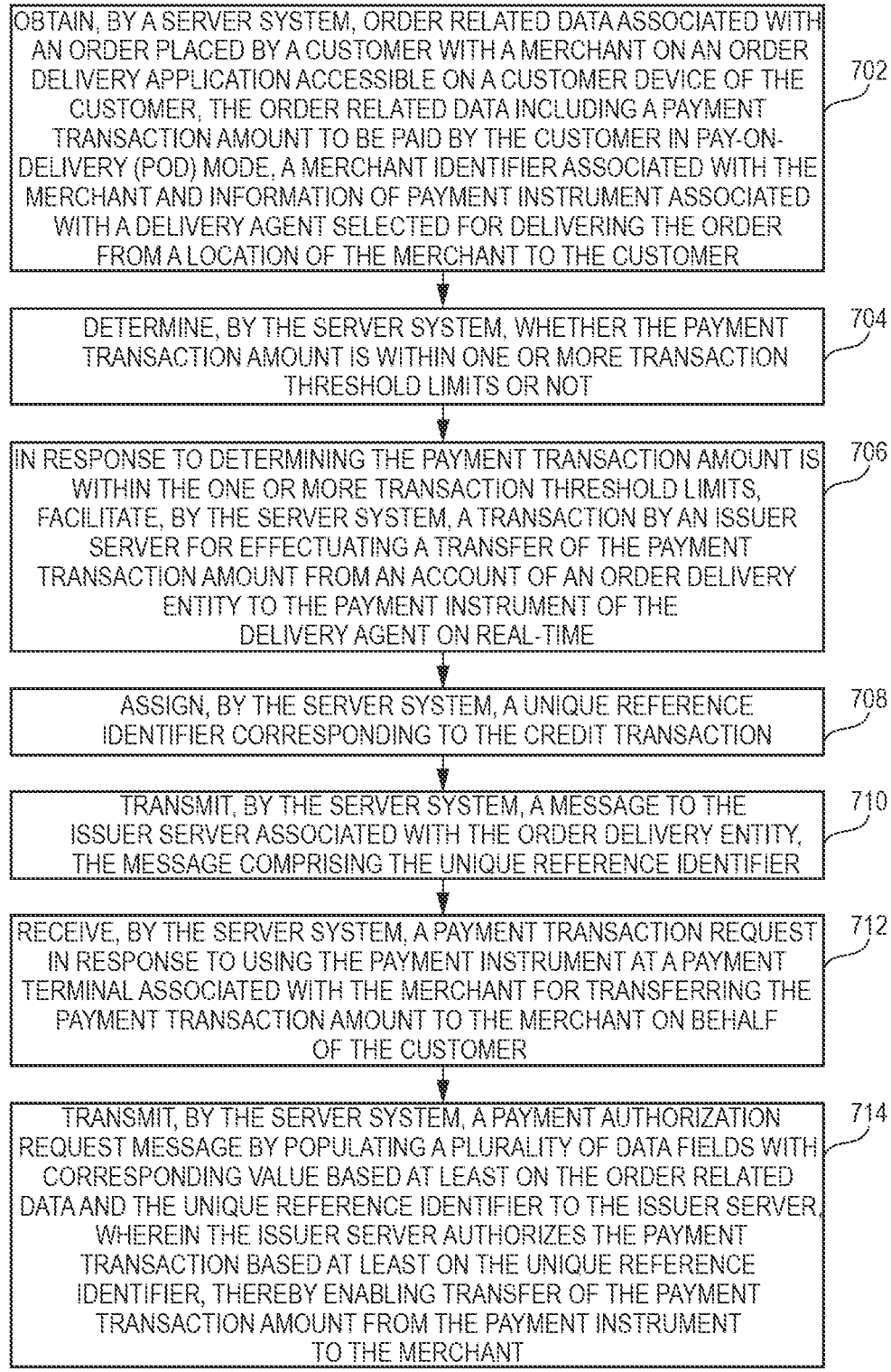
FIG. 7 illustrates a flow diagram of a computer-implemented method for performing the payment transaction using the payment instrument, in accordance with an example embodiment of the present disclosure.

FIG. 7 illustrates a flow diagram of a computer-implemented method 700 for performing a payment transaction using the payment instrument 106, in accordance with an example embodiment of the present disclosure. The method 700 depicted in the flow diagram may be executed by, for example, the server system 114. In an embodiment, the server system 114 can be implemented in the payment server 112. Operations of the flow diagram of method 700, and combinations of operation in the flow diagram of method 700, may be implemented by, for example, hardware, firmware, a processor, circuitry, and/or a different device associated with the execution of software that includes one or more computer program instructions. It is noted that the operations of the method 700 can be described and/or practiced by using a system other than these server systems. The method 700 starts at operation 702.

At 702, the method 700 includes obtaining, by the server system 114, order related data associated with an order placed by a customer with a merchant on an order delivery application accessible on a customer device of the customer. The order related data comprising a payment transaction amount to be paid by the customer in pay-on-delivery (POD) mode, a merchant identifier associated with the merchant and information of payment instrument associated with a delivery agent selected for delivering the order from a location of the merchant to the customer.

At 704, the method 700 includes determining, by the server system 114, whether the payment transaction amount is within one or more transaction threshold limits or not.

At 706, the method 700 includes in response to determining the payment transaction amount is within the one or more transaction threshold limits, facilitating, by the server system 114, a credit transaction by an issuer server for effectuating a transfer of the payment transaction amount from an account of an order delivery entity to the payment instrument of the delivery agent on real-time.

At 708, the method 700 includes assigning, by the server system 114, a unique reference identifier corresponding to the credit transaction.

At 710, the method 700 includes transmitting, by the server system 114, a message to the issuer server associated with the order delivery entity. The message includes the unique reference identifier.

At 712, the method 700 includes receiving, by the server system 114, a payment transaction request in response to using the payment instrument at a payment terminal associated with the merchant for transferring the payment transaction amount to the merchant on behalf of the customer. The payment transaction request includes the information of the payment instrument, the merchant identifier and the payment transaction amount.

At 714, the method 700 includes transmitting, by the server system 114, a payment authorization request message by populating a plurality of data fields with corresponding values based at least on the order related data and the unique reference identifier, to the issuer server 108. The issuer server authorizes the payment transaction based at least on the unique reference identifier, thereby enabling transfer of the payment transaction amount from the payment instrument to the merchant. More specifically, the server system 114 validates the information of the payment instrument, the merchant identifier and the payment transaction amount appended in the payment authorization request message with the order related data.

Figure 8:
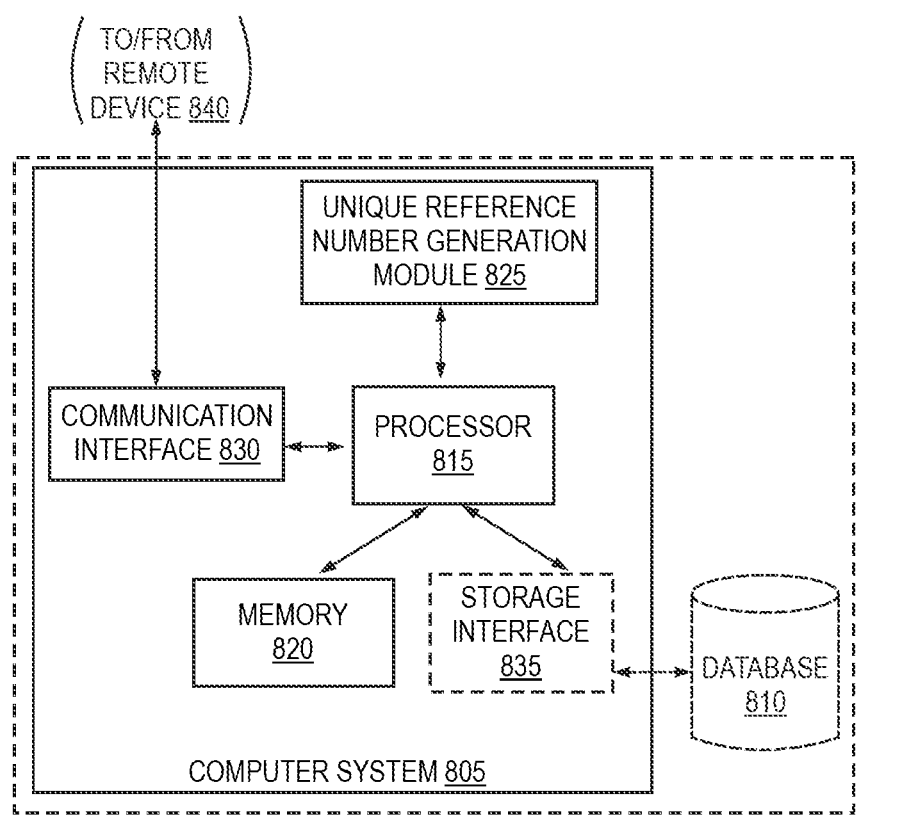
FIG. 8 is a simplified block diagram of a server system for processing the payment transaction associated with the payment instrument, in accordance with one embodiment of the present disclosure.

FIG. 8 is a simplified block diagram of a server system 800 for processing the payment transaction associated with the payment instrument 106, in accordance with one embodiment of the present disclosure. The server system 800 is an example of the server system 114. The server system 800 may be a separate part, and may operate apart via the network 124 (as shown in FIG. 1). In one example embodiment, the server system 800 may be embodied in a payment network (such as the payment network 116 of FIG. 1). Examples of the server system 800 includes, but not limited to, the issuer server 108, the acquirer server 110, and the payment server 112. Further, the server system 800 includes a computer system 805 and a database 810.

The computer system 805 includes at least one processor 815 for executing instructions. Instructions may be stored in, for example, but not limited to, a memory 820. The processor 815 may include one or more processing units (e.g., in a multi-core configuration). The processor 815 is operatively coupled to a communication interface 830 such that computer system 805 is capable of communicating with a remote device 840 such as the order delivery entity 118, the issuer server 108, the payment server 112, and the acquirer server 110. For example, the communication interface 830 may receive the order related data from the order delivery entity 118.

The processor 815 may also be operatively coupled to the database 810. The database 810 is any computer-operated hardware suitable for storing and/or retrieving data, such as, but not limited to, payment card number associated with the payment instrument issued to the delivery agents, transaction data generated as part of sales activities, data related to merchants and the like. The database 810 may include the aforementioned details populated in the corresponding data field of the plurality of data fields. The database 810 may also store the unique reference identifier generated corresponding to the credit transaction.

In some embodiment, the database 810 is integrated within the computer system 805. For example, the database 810 may include multiple storage units such as hard disks and/or solid-state disks in a redundant array of inexpensive disks (RAID) configuration. The database 810 may include a storage area network (SAN) and/or a network attached storage (NAS) system. In some embodiments, the database 810 is integrated within the computer system 805. For example, the computer system 805 may include one or more hard disk drives as the database 810. In other embodiments, the database 810 is external to the computer system 805 and may be accessed by the computer system 805 using a storage interface 835. The storage interface 835 is any component capable of providing the processor 815 with access to the database 810. The storage interface 835 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 815 with access to the database 810.

The processor 815 of the computer system 805 is configured to populate corresponding data fields based on receipt of the order related data. The processor 515 checks the payment transaction amount with the transaction threshold limits (i.e. the transaction limit associated with the payment instrument 106 and the overall pool amount) for processing the credit transaction. Further, the processor 815 performs validation based on receipt of the payment transaction request and either approves or declines the payment transaction based on determining a match between the information of the payment instrument, the merchant identifier and the payment transaction amount present in the payment transaction request, and the stored order related data.

Further, a unique reference identifier generation module 825 of the computer system 805 generates the unique reference identifier based on determining the payment transaction amount to be less than or equal to the transaction limit of the payment instrument 106 and the overall pool amount. More specifically, the unique reference identifier generation module 825 in conjunction with the processor 815 is configured to create the unique reference identifier for processing the payment transaction linked with the payment instrument 106, if the order amount is less than or equal to the transaction threshold limits. The processor 815 may be configured to assign the unique reference to the corresponding data field. Thereafter, the processor 815 routes the message appending the unique reference identifier to the issuer server 108 for storage. The issuer server 108 authorizes the payment transaction linked with the payment instrument 106 based at least on the unique reference identifier, thereby enabling transfer of the payment transaction amount from the payment instrument 106 to the merchant. Further, one or more operations performed by the processor 815 of the server system 800 are already explained in detail, and therefore, they are not reiterated for the sake of brevity.

Figure 9:
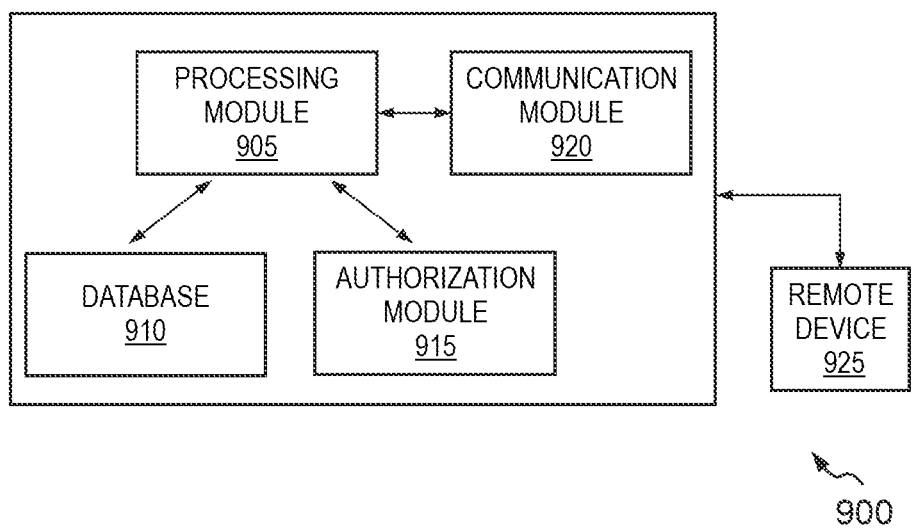
FIG. 9 is a simplified block diagram of an issuer server, in accordance with one embodiment of the present disclosure.

FIG. 9 is a simplified block diagram of an issuer server 900, in accordance with an example embodiment of the present disclosure. The issuer server 900 is an example of the issuer server 108 of FIG. 1. The issuer server 900 is associated with an issuer bank/issuer, in which the order delivery entity 118 may have a payment account. The issuer server 900 issues payment instruments (e.g., the payment instrument 106) to the delivery agent of the order delivery entity 118 for paying towards the order in POD mode to the merchant.

The issuer server 900 includes a processing module 905 operatively coupled to a database 910, and a communication module 920. The components of the issuer server 900 provided herein may not be exhaustive, and that the issuer server 900 may include more or fewer components than those depicted in FIG. 9. Further, two or more components may be embodied in one single component, and/or one component may be configured using multiple sub-components to achieve the desired functionalities. Some components of the issuer server 900 may be configured using hardware elements, software elements, firmware elements, and/or a combination thereof.

The database 910 is configured to store machine executable instructions to be accessed by the processing module 905. Additionally, the database 910 stores information related to the information of the payment instruments (such as payment card number, expiry date etc.) that are issued to the delivery agents, transaction limit associated with each of the payment instruments, the unique reference identifier and the like.

The processing module 905 is configured to communicate with one or more remote devices such as a remote device 925 using the communication module 920 over a network such as the network 124 or the payment network 116 of FIG. 1. The examples of the remote device 925 include a user device (e.g., the user device 104), the payment server 112, the order delivery entity 118, the acquirer server 110, the server system 800, other computing systems of the payment network 116 and the like. The communication module 920 is capable of facilitating such operative communication with the remote devices using API (Application Program Interface) calls.

The processing module 905, in conjunction with an authorization module 915, is configured to authorize the payment transaction associated with the payment instrument 106. The processing module 905 is configured to credit the payment transaction amount to the payment instrument 106 of the delivery agent 102 on real-time as explained above. The processing module 905 receives from the server system 800, the message appended with the unique reference identifier assigned to the corresponding credit transaction. Thereafter, the authorization module 915 retrieves the unique reference identifier and compares the unique reference identifier received in the payment authorization request message. Upon successful matching, the authorization module 915 approves the payment transaction and debits the payment transaction amount from the payment instrument 106.

Figure 10:
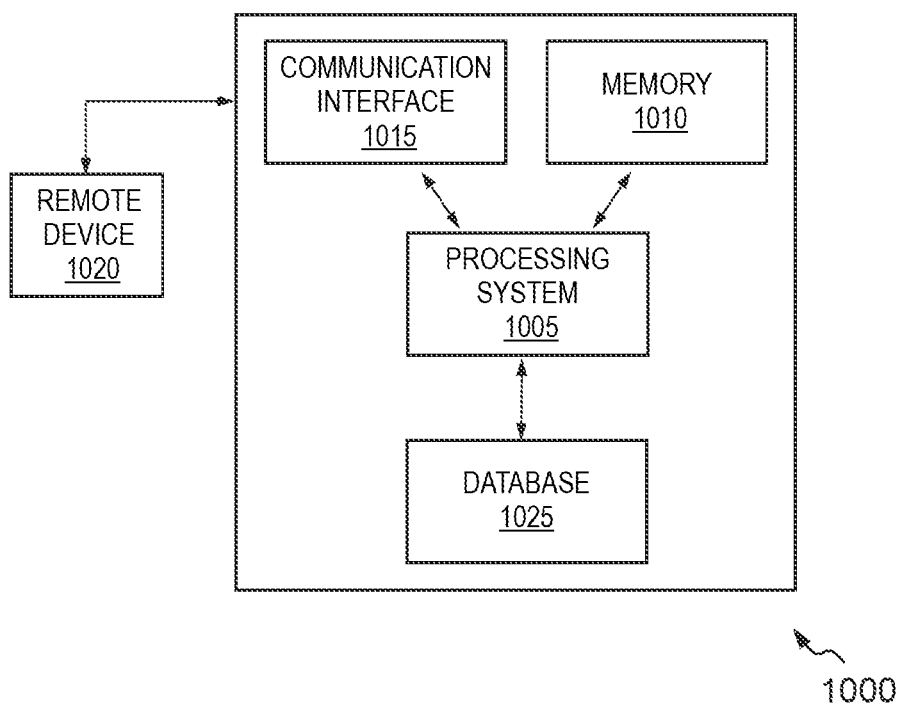
FIG. 10 is a simplified block diagram of a payment server, in accordance with an embodiment of the present disclosure.

FIG. 10 is a simplified block diagram of a payment server 1000, in accordance with one embodiment of the present disclosure. The payment server 1000 is an example of the payment server 112 of FIG. 1. In one embodiment, the payment server 1000 may be embodied in the payment network, such as the payment network 116 of FIG. 1. The payment network 116 may be used by the payment server 1000, the issuer server 900, and the acquirer server 110 as a payment interchange network. Examples of payment interchange network include, but not limited to, Mastercard® payment system interchange network. The payment server 1000 includes a processing system 1005 configured to extract programming instructions from a memory 1010 to provide various features of the present disclosure. The components of the payment server 1000 provided herein may not be exhaustive and the payment server 1000 may include more or fewer components than those depicted in FIG. 10. Further, two or more components may be embodied in one single component, and/or one component may be configured using multiple sub-components to achieve the desired functionalities. Some components of the payment server 1000 may be configured using hardware elements, software elements, firmware elements and/or a combination thereof.

Via a communication interface 1015, the processing system 1005 receives information from a remote device 1020 such as the server system 800, issuer server 900, or the acquirer server 110. The payment server 1000 includes a database 1025. The database 1025 may include payment card number associated with the payment instrument provided to the delivery agents. The payment server 1000 may be configured to identify the transaction type and/or the payment card type based on receipt of the information of the payment instrument 106 from the acquirer server 110. Thereafter, the payment server 1000 routes the transaction to the server system 800. In one embodiment, the payment server 1000 may also perform similar operations as performed by the server system 114 or the server system 800 for processing the payment transaction associated with the payment instrument 106.

Figure 11:
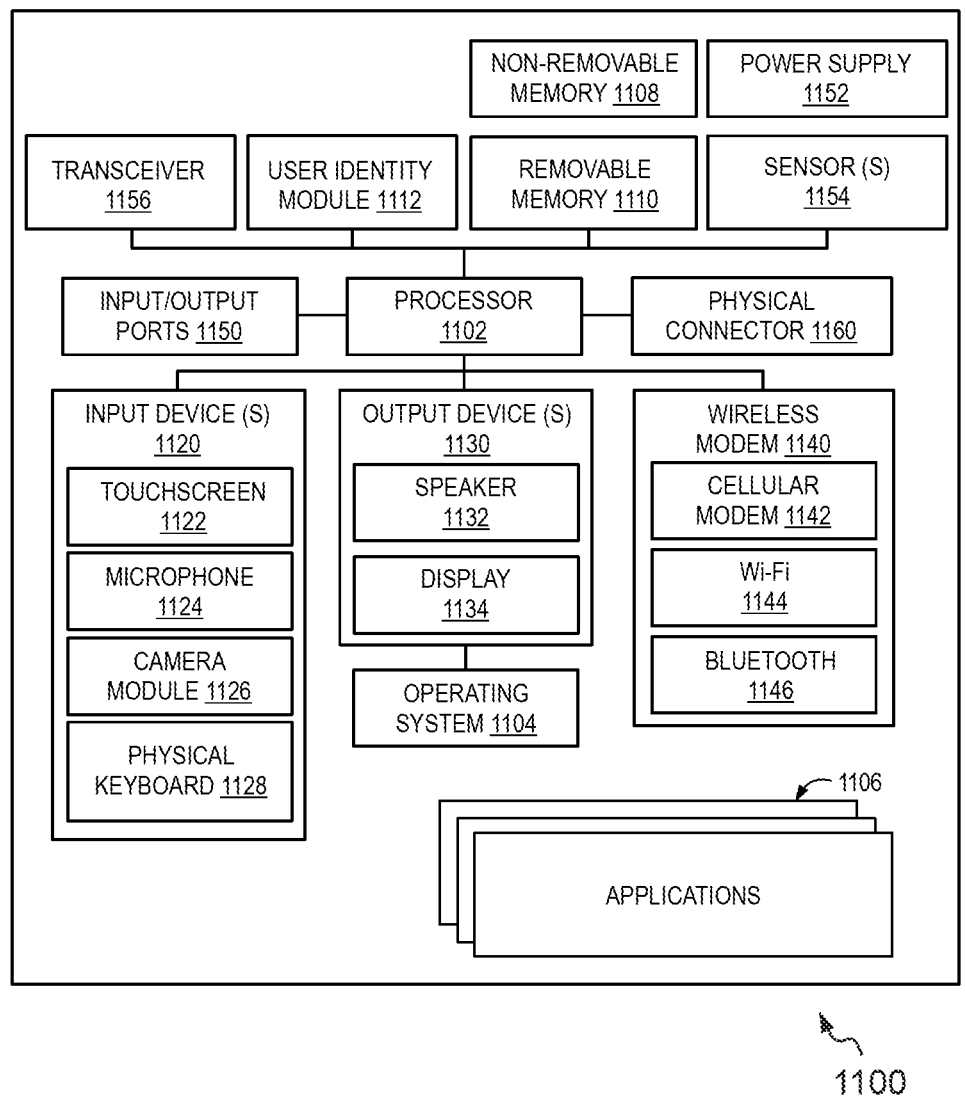
FIG. 11 is a simplified block diagram of an electronic device capable of implementing various embodiments of the present disclosure.

FIG. 11 is a simplified block diagram of an electronic device 1100 capable of implementing various embodiments of the present disclosure. For example, the electronic device 1100 may correspond to the user device 104 or the customer device 128 of FIG. 1. The electronic device 1100 is depicted to include one or more applications 1106. For example, the one or more applications 1106 may include the application 120 of FIG. 1. The application 120 can be an instance of an application provided by the server system 114.

It should be understood that the electronic device 1100 as illustrated and hereinafter described is merely illustrative of one type of device and should not be taken to limit the scope of the embodiments. As such, it should be appreciated that at least some of the components described below in connection with the electronic device 1100 may be optional and thus in an embodiment may include more, less or different components than those described in connection with the embodiment of the FIG. 11. As such, among other examples, the electronic device 1100 could be any of a mobile electronic device, for example, cellular phones, tablet computers, laptops, mobile computers, personal digital assistants (PDAs), mobile televisions, mobile digital assistants, or any combination of the aforementioned, and other types of communication or multimedia devices.

The illustrated electronic device 1100 includes a controller or a processor 1102 (e.g., a signal processor, microprocessor, ASIC, or other control and processing logic circuitry) for performing such tasks as signal coding, data processing, image processing, input/output processing, power control, and/or other functions. An operating system 1104 controls the allocation and usage of the components of the electronic device 1100 and supports for one or more operations of the application (see, the applications 1106), such as the application 120. In addition, the applications 1106 may include common mobile computing applications (e.g., telephony applications, email applications, calendars, contact managers, web browsers, messaging applications) or any other computing application.

The illustrated electronic device 1100 includes one or more memory components, for example, a non-removable memory 1108 and/or removable memory 1110. The non-removable memory 1108 and/or the removable memory 1110 may be collectively known as a database in an embodiment. The non-removable memory 1108 can include RAM, ROM, flash memory, a hard disk, or other well-known memory storage technologies. The removable memory 1110 can include flash memory, smart cards, or a Subscriber Identity Module (SIM). The one or more memory components can be used for storing data and/or code for running the operating system 1104 and the applications 1106. The electronic device 1100 may further include a user identity module (UIM) 1112. The UIM 1112 may be a memory device having a processor built in. The UIM 1112 may include, for example, a subscriber identity module (SIM), a universal integrated circuit card (UICC), a universal subscriber identity module (USIM), a removable user identity module (R-UIM), or any other smart card. The UIM 1112 typically stores information elements related to a mobile subscriber. The UIM 1112 in form of the SIM card is well known in Global System for Mobile (GSM) communication systems, Code Division Multiple Access (CDMA) systems, or with third-generation (3G) wireless communication protocols such as Universal Mobile Telecommunications System (UMTS), CDMA9000, wideband CDMA (WCDMA) and time division-synchronous CDMA (TD-SCDMA), or with fourth-generation (4G) wireless communication protocols such as LTE (Long-Term Evolution).

The electronic device 1100 can support one or more input devices 1120 and one or more output devices 1130. Examples of the input devices 1120 may include, but are not limited to, a touch screen/a display screen 1122 (e.g., capable of capturing finger tap inputs, finger gesture inputs, multi-finger tap inputs, multi-finger gesture inputs, or keystroke inputs from a virtual keyboard or keypad), a microphone 1124 (e.g., capable of capturing voice input), a camera module 1126 (e.g., capable of capturing still picture images and/or video images) and a physical keyboard 1128. Examples of the output devices 1130 may include, but are not limited to, a speaker 1132 and a display 1134. Other possible output devices can include piezoelectric or other haptic output devices. Some devices can serve more than one input/output function. For example, the touch screen 1122 and the display 1134 can be combined into a single input/output device.

A wireless modem 1140 can be coupled to one or more antennas (not shown in FIG. 11) and can support two-way communications between the processor 1102 and external devices, as is well understood in the art. The wireless modem 1140 is shown generically and can include, for example, a cellular modem 1142 for communicating at long range with the mobile communication network, a Wi-Fi compatible modem 1144 for communicating at short range with an external Bluetooth-equipped device or a local wireless data network or router, and/or a Bluetooth-compatible modem 1146. The wireless modem 1140 is typically configured for communication with one or more cellular networks, such as a GSM network for data and voice communications within a single cellular network, between cellular networks, or between the electronic device 1100 and a public switched telephone network (PSTN).

The electronic device 1100 can further include one or more input/output ports 1150, a power supply 1152, one or more sensors 1154 for example, an accelerometer, a gyroscope, a compass, or an infrared proximity sensor for detecting the orientation or motion of the electronic device 1100 and biometric sensors for scanning biometric identity of an authorized user, a transceiver 1156 (for wirelessly transmitting analog or digital signals) and/or a physical connector 1160, which can be a USB port, IEEE 1294 (FireWire) port, and/or RS-232 port. The illustrated components are not required or all-inclusive, as any of the components shown can be deleted and other components can be added.

The disclosed embodiments with reference to FIGS. 1 to 6, or one or more operations of the flow diagram 700 may be implemented may be implemented using software including computer-executable instructions stored on one or more computer-readable media (e.g., non-transitory computer-readable media, such as one or more optical media discs, volatile memory components (e.g., DRAM or SRAM), or non-volatile memory or storage components (e.g., hard drives or solid-state non-volatile memory components, such as Flash memory components)) and executed on a computer (e.g., any suitable computer, such as a laptop computer, net book, Web book, tablet computing device, smart phone, or other mobile computing device). Such software may be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such a suitable communication means includes, for example, the Internet, the World Wide Web, an intranet, software applications, cable (including fiber optic cable), magnetic communications, electromagnetic communications (including RF, microwave, and infrared communications), electronic communications, or other such communication means.

Although the invention has been described with reference to specific exemplary embodiments, it is noted that various modifications and changes may be made to these embodiments without departing from the broad spirit and scope of the invention. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

Particularly, the server system 114 and its various components may be enabled using software and/or using transistors, logic gates, and electrical circuits (for example, integrated circuit circuitry such as ASIC circuitry). Various embodiments of the invention may include one or more computer programs stored or otherwise embodied on a computer-readable medium, wherein the computer programs are configured to cause a processor or computer to perform one or more operations. A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and nonvolatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Various embodiments of the invention, as discussed above, may be practiced with steps and/or operations in a different order, and/or with hardware elements in configurations, which are different than those which are disclosed. Therefore, although the invention has been described based upon these exemplary embodiments, it is noted that certain modifications, variations, and alternative constructions may be apparent and well within the spirit and scope of the invention.

Although various exemplary embodiments of the invention are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A computer-implemented method, comprising:
   obtaining, by a server system, order related data associated with an order placed by a customer with a merchant on an order delivery application accessible on a customer device of the customer, the order related data comprising a payment transaction amount to be paid by the customer in pay-on-delivery (POD) mode, a merchant identifier associated with the merchant and information of payment instrument associated with a delivery agent selected for delivering the order from a location of the merchant to the customer;
   determining, by the server system, that the payment transaction amount is within one or more transaction threshold limits;
   in response to determining that the payment transaction amount is within the one or more transaction threshold limits, sending a request, by the server system, to an issuer server associated with an order delivery entity to transfer the payment transaction amount from an account of the order delivery entity to the payment instrument of the delivery agent;
   based on sending the request, assigning, by the server system, a unique reference identifier corresponding to a credit transaction;
   based on receiving the request, transferring, by the issuer server, the payment transaction amount as the credit transaction from the account of the order delivery entity to the payment instrument of the delivery agent in real-time, the payment instrument credited with the payment transaction amount being prohibited to perform any payment transactions using any of the payment transaction amount without a payment authorization associated with the unique reference identifier;
   transmitting, by the server system, a message to the issuer server, the message comprising the unique reference identifier;
   storing, by the issuer server, the unique reference identifier;
   receiving, by the server system, a payment transaction request, in response to the payment instrument being used at a payment terminal associated with the merchant, for transferring the payment transaction amount to the merchant on behalf of the customer;
   transmitting to the issuer server, by the server system, a payment authorization request message by populating a plurality of data fields with corresponding values based, at least in part, on the order related data and the unique reference identifier;
   comparing, by the issuer server, the unique reference identifier from the payment authorization request message with the stored unique reference identifier;
   based on the unique reference identifier from the payment authorization request message matching the stored unique reference identifier, the issuer server authorizing the payment transaction request, and transferring the payment transaction amount from the payment instrument to the merchant; and
   delivering, by the delivery agent, the order to the customer, and, in response to delivering the order to the customer, receiving the payment transaction amount from the customer.

2. The computer-implemented method as claimed in claim 1, wherein the payment transaction request comprises the information of the payment instrument, the merchant identifier and the payment transaction amount.

3. The computer-implemented method as claimed in claim 2, further comprising:
   validating, by the server system, the information of the payment instrument, the merchant identifier and the payment transaction amount appended in the payment authorization request message with the order related data; and
   retrieving, by the server system, the unique reference identifier based, at least in part, on the payment authorization request message.

4. The computer-implemented method as claimed in claim 1, further comprising:
   upon receipt of the order related data, validating, by the server system, the merchant identifier and the information related to the payment instrument associated with the delivery agent; and
   storing, by the server system, the order related data and the unique reference identifier assigned to the credit transaction in a database associated with the server system, upon facilitating the credit transaction of the payment transaction amount from the account of the order delivery entity to the payment instrument.

5. The computer-implemented method as claimed in claim 1, wherein the one or more transaction threshold limits comprise a first limit associated with the payment instrument valid for a first time period and a second limit associated with an amount deposited with an issuer bank, in an account of an order delivery entity, valid for a second time period.

6. A system, comprising:
an issuer server associated with an order delivery entity, the issuer server comprising:
a first processor; and
a first memory comprising a first set of executable instructions;
a system server comprising:
a communication interface;
a second memory comprising a second set of executable instructions; and
a second processor communicably coupled to the communication interface and configured to execute the second set of executable instructions to cause the server system to at least:
obtain order related data associated with an order placed by a customer with a merchant on an order delivery application accessible on a customer device of the customer, the order related data comprising a payment transaction amount to be paid by the customer in pay-on-delivery (POD) mode, merchant identifier associated with the merchant and information of payment instrument associated with a delivery agent selected for delivering the order from a location of the merchant to the customer,
determine that the payment transaction amount is within one or more transaction threshold limits,
in response to determining that the payment transaction amount is within the one or more transaction threshold limits, send a request to the issuer server to transfer the payment transaction amount from an account of the order delivery entity to the payment instrument of the delivery agent; and
based on sending the request, assign a unique reference identifier corresponding to a credit transaction;
the first processor configured to execute the first set of executable instructions to cause the issuer server to at least:
based on receiving the request, transfer the payment transaction amount as a credit transaction from the account of the order delivery entity to the payment instrument of the delivery agent in real-time, the payment instrument credited with the payment transaction amount being prohibited to perform any payment transactions using any of the payment transaction amount without a payment authorization associated with the unique reference identifier;
receive, from the server system, a message message comprising the unique reference identifier; and
store, by the issuer server, the unique reference identifier;
the second processor configured to execute the second set of executable instructions to further cause the server system to at least:
receive a payment transaction request in response to the payment instrument being used at a payment terminal associated with the merchant, for transferring the payment transaction amount to the merchant on behalf of the customer; and
transmit, to the issuer server, a payment authorization request message by populating a plurality of data fields with corresponding values based, at least in part, on the order related data and the unique reference identifier;
the first processor configured to execute the first set of executable instructions to further cause the issuer server to at least:
compare the unique reference identifier from the payment authorization request message with the stored unique reference identifier; and
based on the unique reference identifier from the payment authorization request message matching the stored unique reference identifier, authorize the payment transaction request; and
transfer the payment transaction amount from the payment instrument to the merchant.

7. The system as claimed in claim 6, wherein the payment transaction request comprises the information of the payment instrument, the merchant identifier and the payment transaction amount.

8. The system as claimed in claim 7, wherein the server system is further caused to:
validate the information of the payment instrument, the merchant identifier and the payment transaction amount appended in the payment authorization request message with the order related data; and
retrieve the unique reference identifier based, at least in part, on the payment authorization request message.

9. The system as claimed in claim 6, wherein the server system is further caused to:
upon receipt of the order related data, validate the merchant identifier and the information related to the payment instrument associated with the delivery agent; and
store the order related data and the unique reference identifier assigned to the credit transaction in a database associated with the server system, upon facilitating the credit transaction of the payment transaction amount from the account of the order delivery entity to the payment instrument.

10. The system as claimed in claim 6, wherein the one or more transaction threshold limits comprise a first limit associated with the payment instrument valid for a first time period and a second limit associated with an amount deposited with an issuer bank, in an account of the order delivery entity, valid for a second time period.

11. The computer-implemented method as claimed in claim 1, further comprising: periodically providing, by the issuer server, a report to the server system, the report including data delineating a quantity of payment instruments issued across a plurality of delivery agents, and the transaction threshold limits assigned to each of the payment instruments.

12. The computer-implemented method as claimed in claim 11, further comprising: periodically providing, by the issuer server, a report to the server system indicating a status of the payment instruments, the status including a quantity of the payment instruments lost, stolen, or revoked, wherein the server system deactivates the quantity of the payment instruments lost, stolen, or revoked.

13. The computer-implemented method as claimed in claim 1, further comprising: upon determining that the customer has cancelled the order, after the credit transaction to the payment instrument, causing a transfer of amount of the credit transaction from the payment instrument back to the account of the order delivery entity.

14. The computer-implemented method as claimed in claim 1, wherein a user device of the delivery agent includes a graphical user interface (GUI), the GUI depicting a total trip distance from a location of the merchant to a location of the customer, and an expected time of arrival (ETA) to the location of the customer on a map.

15. A method comprising:
obtaining, by a server system, order related data associated with an order placed by a customer with a merchant on an order delivery application accessible on a customer device of the customer, the order related data comprising a payment transaction amount to be paid by the customer in pay-on-delivery (POD) mode, a merchant identifier associated with the merchant and data of payment instrument associated with a delivery agent selected for delivering the order from a location of the merchant to the customer;
determining, by the server system, that the payment transaction amount is within one or more transaction threshold limits;
in response to determining that the payment transaction amount is within the one or more transaction threshold limits, sending, by the server system to an issuer server, a request to transfer the payment transaction amount, as credit transaction, from an account of an order delivery entity to the payment instrument of the delivery agent in real-time;
assigning, by the server system, a unique reference identifier to the credit transaction;
transferring, by the issuer server, the payment transaction amount as the credit transaction from the account of the order delivery entity to the payment instrument of the delivery agent in real-time, the payment instrument credited with the payment transaction amount being prohibited to perform any payment transactions using any of the payment transaction amount without a payment authorization associated with the unique reference identifier;
receiving, by the issuer server, the unique reference identifier from the server system;
storing, by the issuer server, the unique reference identifier;
in response to the payment instrument being used at a payment terminal associated with the merchant, receiving, by the server system, a payment transaction request for transferring the payment transaction amount to the merchant on behalf of the customer;
generating, by the server system, a payment authorization request by populating a plurality of data fields with corresponding values based, at least in part, on the order related data and the unique reference identifier;
comparing, by the issuer server, the unique reference identifier from the payment authorization request with the stored unique reference identifier; and
based on the unique reference identifier matching the stored unique reference identifier;
  authorizing, by the issuer server, the payment transaction request based at least on the unique reference identifier; and
  transferring, by the issuer server, the payment transaction amount from the payment instrument to the merchant.

16. The method of claim 15, wherein the one or more transaction threshold limits comprise a first limit associated with the payment instrument valid for a first time period and a second limit associated with an amount deposited with an issuer bank, in an account of an order delivery entity, valid for a second time period.

17. The method of claim 15, wherein the payment transaction request comprises information of the payment instrument, the merchant identifier, and the payment transaction amount.

18. The method of claim 15, further comprising:
validating information of the payment instrument, the merchant identifier and the payment transaction amount appended in the payment authorization request with the order related data; and
retrieving the unique reference identifier based, at least in part, on the payment authorization request.

19. The method of claim 15, further comprising:
causing any other payment transaction amount that has not received a payment authorization associated with a respective unique reference identifier to remain unutilized.

20. The method of claim 19, further-comprising:
reverting the unutilized payment transaction amounts from the payment instrument after a defined period of time.

* * * * *